(12) United States Patent
Sugihara et al.

(10) Patent No.: US 9,568,322 B2
(45) Date of Patent: Feb. 14, 2017

(54) MINING MACHINE MANAGEMENT SYSTEM AND MINING MACHINE MANAGEMENT METHOD

(71) Applicant: Komatsu Ltd., Tokyo (JP)

(72) Inventors: Motohide Sugihara, Fujisawa (JP); Koutarou Hori, Sagamihara (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/350,606

(22) PCT Filed: Aug. 30, 2013

(86) PCT No.: PCT/JP2013/073419
§ 371 (c)(1),
(2) Date: Apr. 9, 2014

(87) PCT Pub. No.: WO2015/029236
PCT Pub. Date: Mar. 5, 2015

(65) Prior Publication Data
US 2015/0066352 A1    Mar. 5, 2015

(51) Int. Cl.
*G01C 21/20* (2006.01)
*E21C 41/00* (2006.01)
*E02F 9/20* (2006.01)
*G01C 21/00* (2006.01)

(52) U.S. Cl.
CPC .............. *G01C 21/20* (2013.01); *E21C 41/00* (2013.01); *G01C 21/005* (2013.01); *E02F 9/2045* (2013.01)

(58) Field of Classification Search
CPC ....... G08G 1/20; E02F 9/2045; G05D 1/0278; G05D 2201/0202
See application file for complete search history.

(56) References Cited

U.S. PATENT DOCUMENTS

| 4,989,151 A * | 1/1991 | Nuimura ................ 701/446 |
| 5,774,824 A * | 6/1998 | Streit et al. ............ 701/446 |
| 5,956,250 A * | 9/1999 | Gudat et al. ............. 701/26 |

(Continued)

FOREIGN PATENT DOCUMENTS

| CA | 2817818 A1 | 6/2012 |
| CA | 2815238 A1 | 5/2013 |

(Continued)

OTHER PUBLICATIONS

Schroedl et al. "Mining GPS Traces for Map Refinement", Data Mining and Knowledge Discovery, vol. 9.1 (Jul. 2004): pp. 59-87.*

(Continued)

*Primary Examiner* — Todd Melton
(74) *Attorney, Agent, or Firm* — Locke Lord LLP

(57) ABSTRACT

A mining machine management system includes: a position information detection unit which is mounted in a mining machine loading a load in a mine and transporting the load and detects position information related to a position of the mining machine; and a region specification unit which corrects a representative position of a discharging station at which the load is removed, based on position information of a position at which the load is removed from the mining machine within a predetermined range centered around the representative position, from among the position information detected by the position information detection unit.

17 Claims, 18 Drawing Sheets

(56) References Cited

U.S. PATENT DOCUMENTS

| | | | |
|---|---|---|---|
| 6,044,312 A * | 3/2000 | Sudo et al. | 701/25 |
| 6,484,078 B1 * | 11/2002 | Kageyama | 701/25 |
| 8,868,302 B2 * | 10/2014 | Everett et al. | 701/50 |
| 8,972,103 B2 * | 3/2015 | Elwart | G01C 21/32 |
| | | | 342/357.21 |
| 2009/0063031 A1 | 3/2009 | Greiner et al. | |
| 2014/0297091 A1 | 10/2014 | Itoi et al. | |

FOREIGN PATENT DOCUMENTS

| | | |
|---|---|---|
| CN | 101779098 A | 7/2010 |
| CN | 103210414 A | 7/2013 |
| JP | 05-290103 A | 11/1993 |
| JP | 2000-205868 A | 7/2000 |
| JP | 2013-096198 A | 5/2013 |
| JP | 2013-105278 A | 5/2013 |
| WO | WO-2009/065448 A1 | 5/2009 |
| WO | WO-2012/074658 A2 | 6/2012 |

OTHER PUBLICATIONS

Decision of a Patent Grant mailed Oct. 7, 2014, issued for the Japanese patent application No. 2013-558246 and English translation thereof.

International Search Report dated Nov. 12, 2013, issued for PCT/JP2013/073419.

Office Action dated Jul. 7, 2015, issued for the Canadian patent application No. 2,848,840.

Stefan Schroedl et al., "Mining GPS Traces for Map Refinement," Data Mining and Knowledge Discovery, vol. 9, 2004, pp. 59-87.

* cited by examiner

| | 1 | 2 | 3 | 4 | 5 |
|---|---|---|---|---|---|
| RANGE (%) | SLP < -a | -a ≤ SLP < b | b ≤ SLP ≤ c | c < SLP ≤ d | d < SLP |

MINING MACHINE MANAGEMENT SYSTEM AND MINING MACHINE MANAGEMENT METHOD

FIELD

The present invention relates to a system and method of managing a mining machine.

BACKGROUND

A variety of construction machines such as an excavator and a dump truck are operated at a construction work site or a mining site in a mine. What is increasingly performed in recent years is that operation information of a construction machine is acquired by wireless communication to grasp the state of the construction machine. An operation simulation system of a conveying machine is described in Patent Literature 1, for example.

CITATION LIST

Patent Literature

Patent Literature 1: Japanese Laid-open Patent Application Publication No. 5-290103

SUMMARY

Technical Problem

When one intends to perform track design evaluation or give driving instruction for a driver in order to improve productivity at a mine, an analysis is required for each route traveled by a mining machine. In order to attain such purpose, one needs to generate a new track map of an operation site of the mining machine as well as detect and analyze what kind of event occurs when the mining machine travels at which position in the generated track map and what kind of operation is performed. It is therefore required to specify a route traveled by the mining machine by distinguishing the route. However, it is difficult for the operation simulation described in Patent Literature 1 to accurately distinguish and specify the route traveled by the mining machine.

An object of the present invention is to improve the accuracy in distinguishing and specifying the route traveled by the mining machine in a mine.

Solution to Problem

According to the present invention, a mining machine management system comprises: a position information detection unit which is mounted in a mining machine loading a load in a mine and transporting the load, and detects position information related to a position of the mining machine; a storage unit which stores route information of a first route as a registered route, the first route being a route taken by the mining machine departing a predetermined first position, passing a second position as a loading position at which the load is loaded, and moving to a third position as a discharging position at which the load is removed; and a region specification unit which determines whether or not a position information group obtained from a plurality of pieces of the position information detected by the position information detection unit while the mining machine is in operation corresponds with the loading position or the discharging position included in the route information of the first route and, when the position information group is determined to correspond with the loading or discharging position, corrects the loading position or the discharging position stored in the storage unit based on the position information of the position information group determined to correspond with the loading or discharging position.

In the present invention, it is preferable that when the region specification unit corrects the discharging position, the region specification unit corrects the discharging position on the registered route based on the position information of a position at which the load is removed from the mining machine within a first predetermined range around the discharging position on the registered route, from among the position information group.

In the present invention, it is preferable that the correction is made by determining a middle point between the position at which the load is removed and the discharging position on the registered route to be a corrected discharging position on the registered route.

In the present invention, it is preferable that the loading position is corrected by the region specification unit by determining position information of a position, at which the load is loaded onto the mining machine within a second predetermined range around the loading position on the registered route from among the position information group, to be a corrected loading position on the registered route.

In the present invention, it is preferable that the mining machine management system further comprises a route information generation unit which generates route information of a route traveled by the mining machine, the route information including a plurality of nodes present at every predetermined distance of the route and a link connecting the nodes adjacent to each other, wherein the route information generation unit generates the node in a region excluding an interior of a passing position exclusion region of a predetermined size that is set around the discharging position on the registered route and greater than the first predetermined range on a discharging side set around the discharging position on the registered route.

In the present invention, it is preferable that the mining machine management system further comprises a route information generation unit which generates route information of a route traveled by the mining machine, the route information including a plurality of nodes present at every predetermined distance of the route and a link connecting the nodes adjacent to each other, wherein the route information generation unit generates the node in a region excluding an interior of a passing position exclusion region of a predetermined size that is greater than the second predetermined range on a loading side around the loading position on the registered route and is set around the loading position on the register route.

In the present invention, it is preferable that the route information generation unit determines that the loading station stays a same for a predetermined period of time when a position of the loading station is within a predetermined range for the predetermined period of time.

According to the present invention, a mining machine management method comprises: detecting position information related to a position of a mining machine loading a load in a mine and transporting the load; determining route information of a first route as a registered route, the first route being a route taken by the mining machine departing a predetermined first position, passing a second position as a loading position at which the load is loaded, and moving to a third position as a discharging position at which the load is removed; determining whether or not a position information group obtained from a plurality of pieces of the position information detected while the mining machine is in operation corresponds with the loading position or the discharging position included in the route information of the first route; and correcting the loading position or the discharging position based on position information of the position information group that is determined to correspond with the loading or discharging position, when the position information group is determined to correspond with the loading or discharging position.

In the present invention, it is preferable that when correcting the discharging position, the discharging position on the registered route is corrected based on position information of a position at which the load is removed from the mining machine within a first predetermined range around the discharging position on the registered route, from among the position information group.

In the present invention, it is preferable that the correction is made by determining a middle point between the position at which the load is removed and the discharging position on the registered route to be a corrected discharging position on the registered route.

In the present invention, it is preferable that the loading position is corrected by determining position information of a position, at which the load is loaded onto the mining machine within a second predetermined range around the loading position on the registered route from among the position information group, to be a corrected loading position on the registered route.

In the present invention, it is preferable that after the correction is made, a node is generated in a region excluding an interior of a passing position exclusion region of a predetermined size that is set around the discharging position on the registered route and greater than the first predetermined range on a discharging side set around the discharging position on the registered route, the node being present at every predetermined distance of a route traveled by the mining machine.

In the present invention, it is preferable that after the correction is made, a node is generated in a region excluding an interior of a passing position exclusion region of a predetermined size that is greater than the second predetermined range on a loading side around the loading position on the registered route and is set around the loading position on the registered route, the node being present at every predetermined distance of a route traveled by the mining machine.

In the present invention, it is preferable that in detecting the loading position on the registered route, the loading station is determined to be a same for a predetermined period of time when a position of the loading station is within a predetermined range for the predetermined period of time.

The present invention can improve the accuracy in distinguishing and specifying the route traveled by the mining machine in the mine.

BRIEF DESCRIPTION OF DRAWINGS

FIG. 20-1 is a diagram used to describe a process of extracting a passing position WP on a registered route that corresponds with position information PI on an actual travel route.

FIG. 20-2 is a diagram used to describe a method of newly generating a passing position.

DESCRIPTION OF EMBODIMENTS

Modes for carrying out the present invention (embodiments) will be described in detail with reference to the drawings.

Figure 1:
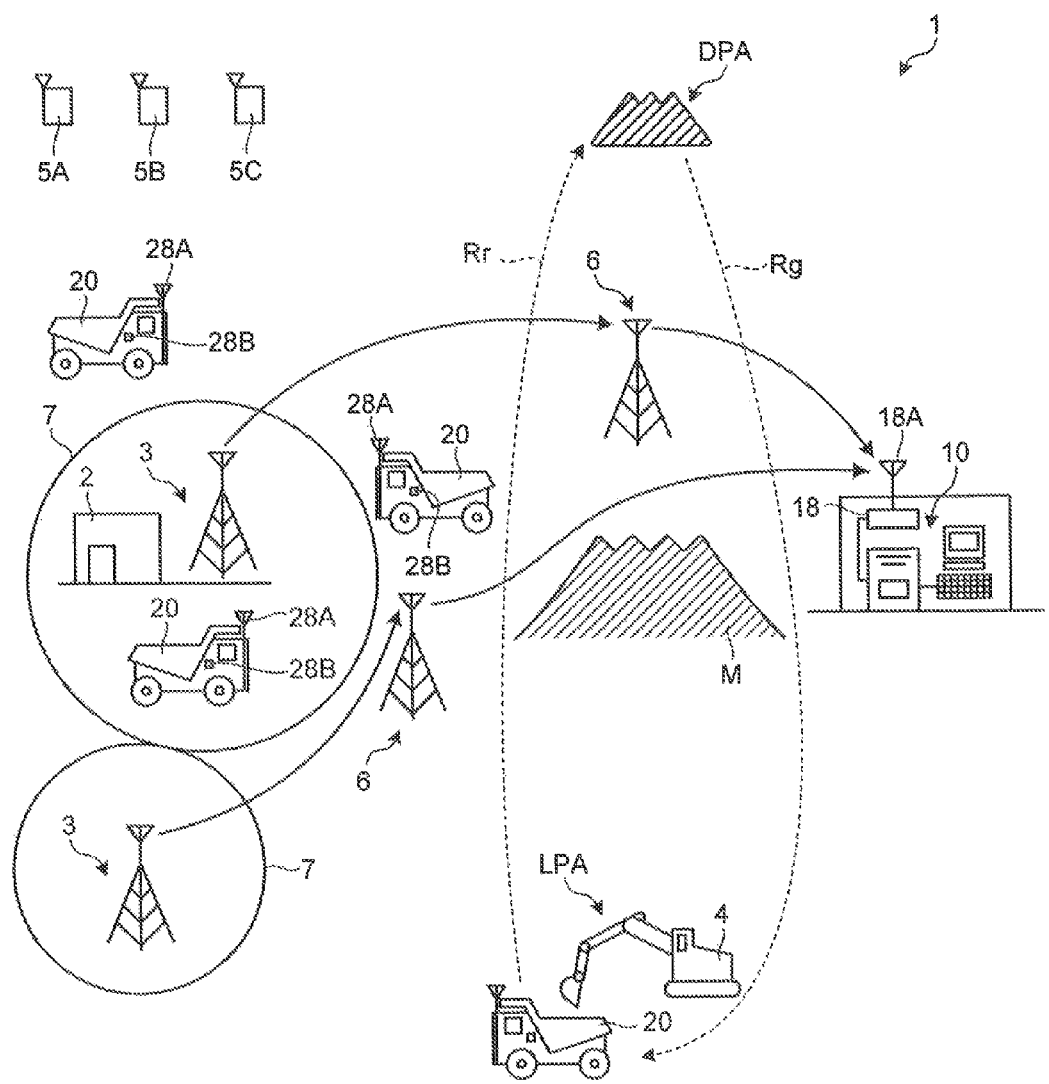
FIG. 1 is a diagram illustrating a site at which a mining machine management system according to the present embodiment is applied.

FIG. 1 is a diagram illustrating a site at which a mining machine management system according to the present embodiment is applied. A mining machine management system 1 manages operation of a mining machine, evaluates productivity or operating technique of an operator who operates the mining machine, performs preventive maintenance and an abnormality diagnosis on a dump truck, and the like. The management system 1 thus specifies a route traveled by a dump truck 20 and stores the route as route information. A travel route hereinafter includes a route traveled by the dump truck 20 and a location at which the dump truck 20 stops. The travel route is hereinafter also referred to as a route as appropriate.

The mining machine is a general term for machines used in a variety of operations performed in a mine. The dump truck 20 is illustrated in the present embodiment as an example of a transporting vehicle that is a type of the mining machine, where the dump truck transports crushed stones, or sediment or rocks produced at the time of mining the crushed stones, as a load. The mining machine of the present embodiment is however not limited to the dump truck 20. The mining machine according to the present embodiment may be an excavator or an electric excavator that functions as an excavating machine mining the crushed stones and the like, or may be a wheel loader, for example. While the dump truck 20 in the present embodiment is a manned mining machine that travels or unloads by an operation of the operator, the dump truck 20 is not limited to such machine. The dump truck 20 may be an unmanned dump truck, the operation of which is managed by the management system 1, for example.

A loading machine 4 such as the excavator loads the rocks or sediment onto the dump truck 20 at a location where a loading operation is performed (hereinafter referred to as a loading station) LPA in a mine. The dump truck 20 then discharges the loaded rocks or sediment at a location where a discharge operation of the load is performed (hereinafter referred to as a discharge station) DPA. The dump truck 20 moves between the loading station LPA and the discharge station DPA while travelling routes Rg and Rr.

<Overview of Mining Machine Management System>

The mining machine management system (hereinafter referred to as a management system as appropriate) 1 is configured such that a management device 10 collects operation information, which includes information pertaining to the position of the dump truck 20 serving as the mining machine, from the dump truck 20 by means of wireless communication. The management device 10 is set up in a management facility of a mine, for example, unlike the dump truck 20 which is a moving body. The management device 10 is thus considered not to move in principle. The information collected by the management device 10 is a piece of information pertaining to an operating state of the dump truck 20 (hereinafter referred to as operation information as appropriate) and corresponds to at least one of position information (coordinates including latitude, longitude, and altitude) pertaining to the position of the dump truck 20 and travel time, a travel distance, an engine water temperature, presence of abnormality, a site of abnormality, a fuel consumption rate, and a load amount of the dump truck, for example. The operation information is mainly used to generate a track map of the dump truck 20 as well as to perform track mapping, driving evaluation, preventive maintenance, abnormality diagnosis and the like of the dump truck 20. The operation information is therefore useful in meeting the needs such as increasing productivity of a mine and improving operation in the mine.

In order to collect the operation information of the dump truck 20 operating in the mine, the management device 10 is connected to a management-side wireless communication device 18 which has an antenna 18A. The dump truck 20 is equipped with an in-vehicle wireless communication device and an antenna 28A in order to transmit the operation information and perform intercommunication with the management device 10. The in-vehicle wireless communication device will be described later on. In addition, the dump truck 20 can measure its own position by receiving radio wave from GPS (Global Positioning System) satellites 5A, 5B, and 5C with a GPS antenna 28B. Note that the own position may be measured not only by the GPS satellite but by another positioning satellite. In other words, the position need only be measured by a GNSS (Global Navigation Satellite System).

The output of radio wave transmitted from the antenna 28A of the dump truck 20 does not have a communicable range large enough to cover the entire mine. Moreover, the radio wave transmitted from the antenna 28A cannot be transmitted to a distant place beyond an obstacle such as a high mountain due to an issue related to the wavelength. Such communication failure is certainly resolved to be able to have a wider communicable range and eliminate an incommunicable location by using a wireless communication device that can output radio wave at high power. It is however required to keep down the cost of a repeater and a communication device in the mine that is extensive, and to cope with a situation where one cannot expect to secure well-maintained communication infrastructure depending on an area in which the mine is located. As a result, the management system 1 employs a wireless system such as a wireless LAN (Local Area Network) that can form an information network within a limited range. The wireless LAN can realize the intercommunication between the mining machine and the management facility (the management device 10) at low cost, but the problem of communication failure still needs to be solved.

The coverage of radio wave transmitted from the antenna 28A of the dump truck 20 is limited. Therefore, it is difficult for the management-side wireless communication device 18 to receive the radio wave transmitted from the dump truck 20 when the dump truck 20 and the management device 10 are distant from each other or when there is an obstacle such as a mountain M present between the two. The management system 1 thus includes a repeater 3 which relays the radio wave transmitted from the antenna 28A of the dump truck 20 and transmits the radio wave to the management-side wireless communication device 18. The management device 10 can collect the operation information, via wireless communication, from the dump truck 20 operating at a position far from the management device by installing the repeater 3 at a plurality of predetermined sites within the mine.

A midway repeater 6 is disposed between the repeater 3 and the management-side wireless communication device 18 to relay the radio wave between the two when the repeater 3 is distant from the management-side wireless communication device 18. The midway repeater 6 in the present embodiment only performs relay between the repeater 3 and the management-side wireless communication device 18, and does not relay the radio wave transmitted from the antenna 28A of the dump truck 20. The midway repeater 6 in the present embodiment is adapted to not relay the radio wave from anywhere but the corresponding repeater 3. As illustrated in FIG. 1, for example, there is only one midway repeater 6 that relays the radio wave from the repeater 3 at a fueling station 2. While it is represented in FIG. 1 that the midway repeater 6 is in one-to-one relationship with a single repeater 3, each midway repeater 6 can relay the radio wave transmitted from a plurality of corresponding repeaters 3.

Figure 3:
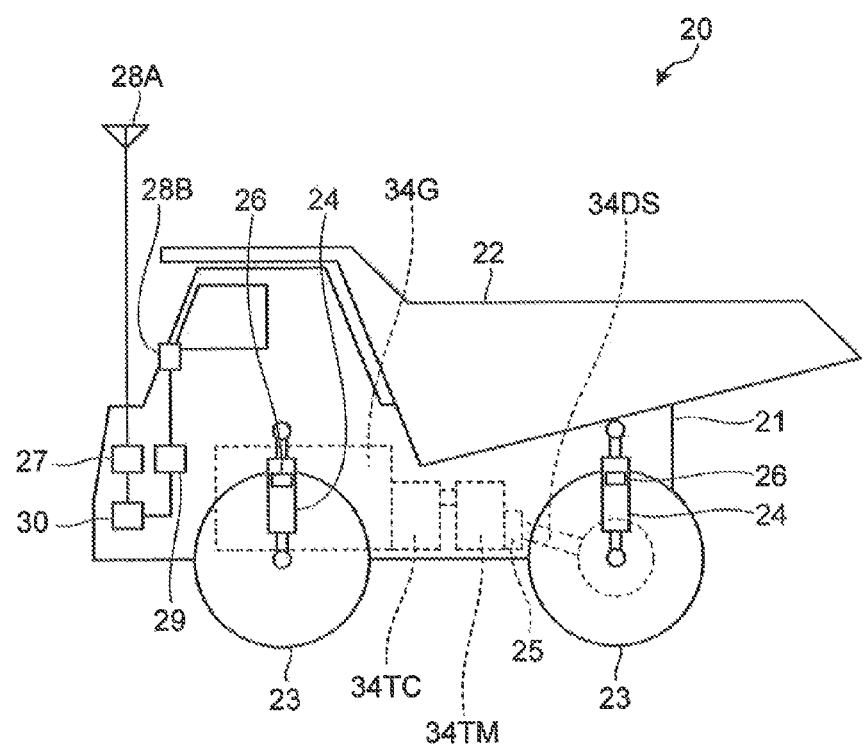
FIG. 3 is a diagram illustrating a structure of a dump truck.

A predetermined region centered around the installation location of the repeater 3 (a region represented by a circle in FIG. 1) corresponds to a range, namely a communicable range 7, within which a first wireless communication device (an in-vehicle wireless communication device 27 to be described; refer to FIG. 3) mounted in the dump truck 20 can mutually perform wireless communication with the repeater 3. The dump truck 20 present within the communicable range 7 can mutually perform wireless communication with the management-side wireless communication device 18 through the repeater 3 or the like.

When the management device 10 collects the operation information from the dump truck 20 via wireless communication, the dump truck 20 sometimes moves out of the communicable range 7 by travelling while transmitting the operation information or the like to the management device 10. As a result, the communication is interrupted in some cases before the first wireless communication device mounted in the dump truck 20 transmits all the operation information that is to be transmitted to the management device 10.

In order to avoid the interruption of communication, it is preferred that the dump truck 20 stay within the communicable range 7 while the management device 10 receives the operation information and the like or, in other words, while the dump truck 20 transmits the operation information and the like. It is therefore preferred to receive the radio wave from the antenna 28A of the dump truck 20 which is at a location where the dump truck 20 is at a stop such that the dump truck 20 surely stays within the communicable range 7. Accordingly, it is preferred to perform control such that the dump truck 20 transmits the operation information and the like to the repeater 3 at a location where the dump truck 20 is at a stop surely within the communicable range 7 for a certain period of time (time long enough to be able to transmit all the operation information and the like to be transmitted, or longer).

The repeater 3 is installed at the fueling station 2, for example, in the present embodiment. The dump truck 20 is expected to stop for a certain period of time at the fueling station 2 in order to fill the dump truck 20 with a fuel which drives an engine of the truck. This means that the dump truck 20 can remain surely within the communicable range 7 while the management device 10 surely receives the operation information and the like from the dump truck 20 being fueled. As a result, the management device 10 can surely collect the operation information and the like from the dump truck 20 via wireless communication. The mine being extensive, the present embodiment is adapted to collect the operation information from the dump truck 20 in operation by disposing the repeater 3 in the vicinity of a travel route of the dump truck 20 besides the fueling station 2. Now, the management device 10 will be described in more detail.

<Management Device>

Figure 2:
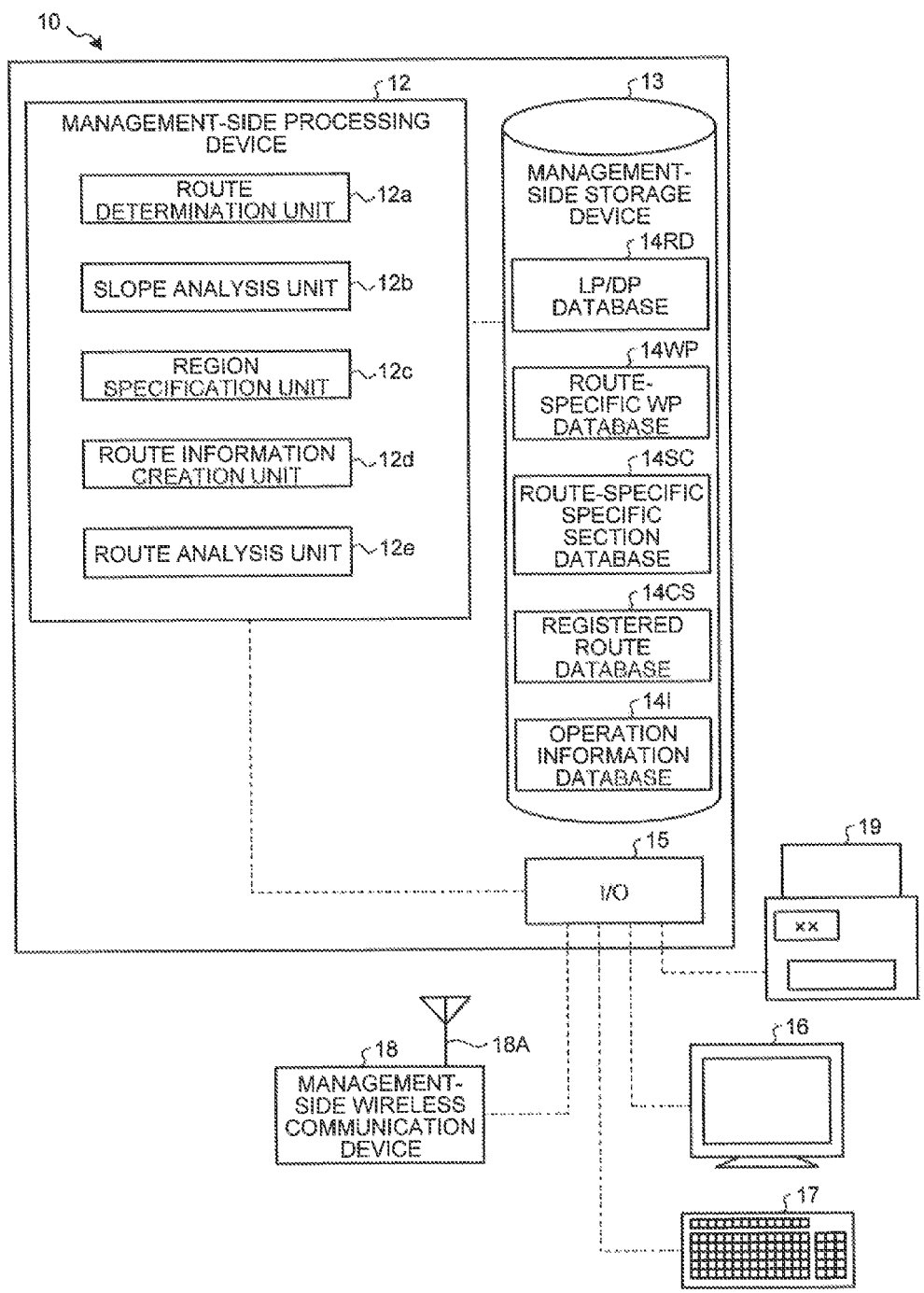
FIG. 2 is a functional block diagram of a management device included in the mining machine management system according to the present embodiment.

FIG. 2 is a functional block diagram of the management device included in the mining machine management system according to the present embodiment. The management device 10 includes a management-side processing device 12, a management-side storage device 13, and an input/output unit (I/O) 15. The input/output unit 15 of the management device 10 is further connected to a display device 16, an input device 17, the management-side wireless communication device 18, and an output device 19. The management device 10 is a computer, for example. The management-side processing device 12 is a CPU (Central Processing Unit), for example. The management-side storage device 13 is a RAM (Random Access Memory), a ROM (Read Only Memory), a flash memory or a hard disk drive, or a combination of these. The input/output unit 15 is used to input/output information (used as an interface) between the management-side processing device 12 and the display device 16, the input device 17, the management-side wireless communication device 18 and the output device 19 that are externally connected to the management-side processing device 12.

The management-side processing device 12 implements a mining machine management method according to the present embodiment. The management-side processing device 12 includes a route determination unit 12a, a slope analysis unit 12b, a region specification unit 12c, a route information generation unit 12d, and a route analysis unit 12e. The route determination unit 12a as a determination unit specifies a route that is actually traveled by the dump truck 20 in the mine by determining whether or not the route corresponds with an existing travel route. The existing travel route is a route traveled by the dump truck 20 in the past or a preset route.

The slope analysis unit 12b analyzes the route traveled by the dump truck 20 and divides the route by every predetermined range of slope. The region specification unit 12c specifies the loading station LPA at which the dump truck 20 is loaded and the discharge station DPA at which the dump truck is unloaded. The route information generation unit 12d generates the route information as a piece of information pertaining to the position of the route traveled by the dump truck 20. The route information is a piece of information of a first route that is a route taken by the dump truck 20 departing a predetermined first position, passing a second position at which a load (crushed stones, or sediment or rocks produced at the time of mining the crushed stones) is loaded, and moving to a third position at which the dump truck is unloaded. The route information includes a plurality of nodes present at every predetermined distance and a link which connects the nodes adjacent to each other. The route analysis unit 12e analyzes the route traveled by the dump truck 20 to extract a part having the identical characteristic or integrate the extracted part, for example. The characteristic is a slope, a bearing angle, and the like. These functions are realized when the management-side processing device 12 reads a computer program corresponding to each function from the management-side storage device 13 and executes the program.

The management-side storage device 13 stores a variety of computer programs used by the management-side processing device 12 to execute a variety of processes. The computer program stored in the management-side storage device 13 in the present embodiment includes a route specifying computer program which specifies the route traveled by the dump truck 20 by implementing the mining machine management method according to the present embodiment, an operation information collecting computer program which collects the operation information and the like of the dump truck 20, and a computer program which realizes a variety of analyses based on the operation information and the like, for example.

The management-side storage device 13 stores an LP/DP database 14RD, a route-specific WP database 14WP, a route-specific specific section database 14SC, a registered route database 14CS, an operation information database 14I and the like. The position information on each of the loading station LPA and the discharge station DPA of the dump truck 20 is described in the LP/DP database 14RD. The position information on the route that has been or is traveled by the dump truck 20 is described in the route-specific WP database 14WP. Described in the route-specific specific section database 14SC is a piece of information on a specific section as a part of the route having the identical characteristic, the route having been or being traveled by the dump truck 20. Described in the registered route database 14CS is a piece of information including position information on the route traveled by the dump truck 20 operating in the mine or on a preset route to be traveled by the dump truck 20 in the mine. The operation information collected from the dump truck 20 is described in the operation information database 14I. The route-specific WP database 14WP and the route-specific specific section database 14SC include aggregated data of the coordinates including the latitude, the longitude, and the altitude of the position information.

The management device 10 in the present embodiment determines whether or not the first route and a second route are identical based on at least the position information included in the first route stored in the management-side storage device 13 and a position information group of the second route obtained from a plurality of pieces of position information of the dump truck 20 while the dump truck 20 is in operation. The management device 10 specifies the second route that is the route traveled by the dump truck 20 in this manner. As described above, the first route is the route taken by the dump truck 20 when it departs from the predetermined first position, moves to the loading station LPA as the second position at which the truck is loaded, and moves to the discharge station DPA as the third position at which the truck is unloaded. The position information of the first route is described in the LP/DP database 14RD and the route-specific WP database 14WP.

The predetermined first position at which the dump truck 20 starts travelling (hereinafter referred to as a travel starting position as appropriate) is the discharge station DPA, for example. The travel starting position and the discharge station DPA at which the dump truck 20 discharges the load loaded at the loading station LPA may be the same or different when the travel starting position of the dump truck 20 is the discharge station DPA.

The display device 16 is a liquid crystal display, for example, and displays information required in collecting the position information or operation information of the dump truck 20. The input device 17 is a keyboard, a touch panel, or a mouse, for example, and inputs information required in collecting the position information or operation information of the dump truck 20. The management-side wireless communication device 18 includes the antenna 18A and mutually performs wireless communication with the in-vehicle wireless communication device 27 (refer to FIG. 3) of the dump truck 20 through the repeater 3. The output device 19 is a printing device (a printer), for example. The output device 19 prints and outputs a report or the like prepared by the management device 10. The output device 19 may be further adapted to output voice according to report content to be described later on. Next, the dump truck 20 will be described in more detail.

<Dump Truck>

FIG. 3 is a diagram illustrating the structure of the dump truck 20. The dump truck 20 travels with the load loaded thereon and discharges the load at a desired location. The dump truck 20 includes a vehicle body 21, a vessel 22, a vehicle wheel 23, a suspension cylinder 24, a rotational speed sensor 25, a suspension pressure sensor (hereinafter referred to as a pressure sensor as appropriate) 26, the in-vehicle wireless communication device 27 to which the antenna 28A is connected, a position information detection device (a GPS receiver in the present embodiment) 29 to which the GPS antenna 28B is connected, and an in-vehicle information collection device 30. Note that the dump truck 20 includes a variety of mechanisms and functions included in a general conveying machine in addition to the aforementioned structure. While the rigid dump truck 20 is illustrated as an example in the present embodiment, the dump truck 20 may also be an articulated dump truck, the body of which is divided into a front part and a rear part that are joined by a free articulation.

The vehicle wheel 23 of the dump truck 20 is driven when an internal-combustion engine (hereinafter referred to as an engine 34G as appropriate) such as a diesel engine drives a drive shaft 34DS through a torque converter 34TC and a transmission 34TM. The dump truck 20 thus adopts what is called a mechanical drive system but the drive system of the dump truck 20 is not limited to this. The dump truck 20 may adopt what is called an electrical drive system instead. The vessel 22 functions as a loading space where the load is loaded, and is disposed in an upper part of the vehicle body 21 to be able to freely move up and down. The crushed stones being mined or rocks or soil are loaded as the load onto the vessel 22 by the loading machine 4 such as the excavator.

The vehicle wheel 23 formed of a tire and a wheel is rotatably mounted to the vehicle body 21 and is driven by the power transmitted from the vehicle body 21 as described above. The suspension cylinder 24 is disposed between the vehicle wheel 23 and the vehicle body 21. The vehicle body 21, the vessel 22, and a load generated according to the mass of the load being loaded onto the truck act upon the vehicle wheel 23 through the suspension cylinder 24.

The rotational speed sensor 25 measures a vehicle speed by detecting the rotational speed of the drive shaft 34DS which drives the vehicle wheel 23. The interior of the suspension cylinder 24 is filled with hydraulic fluid so that the cylinder expands/contracts according to the weight of the load. The pressure sensor 26 detects the load acting upon the suspension cylinder 24. The pressure sensor 26 is installed in each suspension cylinder 24 of the dump truck 20 and can measure the mass (load amount) of the load by detecting the pressure on the hydraulic fluid in the suspension cylinder.

The GPS antenna 28B receives radio wave output from the plurality of GPS satellites 5A, 5B, and 5C (refer to FIG. 1) configuring the GPS (Global Positioning System). The GPS antenna 28B outputs the radio wave being received to the position information detection device 29. The position information detection device 29 serving as a position information detection unit converts the radio wave received by the GPS antenna 28B into an electric signal and finds the position information of the dump truck 20 by calculating (measuring) the position information of the device itself, namely, the position of the dump truck 20. The position information pertains to the position of the dump truck 20 and includes the coordinates of the latitude, the longitude, and the altitude. A plurality of pieces of position information, acquired by the position information detection device 29 based on the lapse of time and arranged in time series, becomes the route traveled by the dump truck 20.

The in-vehicle wireless communication device 27 performs wireless communication mutually with the repeater 3 or the antenna 18A of the management facility illustrated in FIG. 1 through the antenna 28A. The in-vehicle wireless communication device 27 is connected to the in-vehicle information collection device 30. Such structure allows the in-vehicle information collection device 30 to transmit/receive each information through the antenna 28A. The in-vehicle information collection device 30 and a peripheral device thereof will now be described.

<In-Vehicle Information Collection Device and Peripheral Device Thereof>

Figure 4:
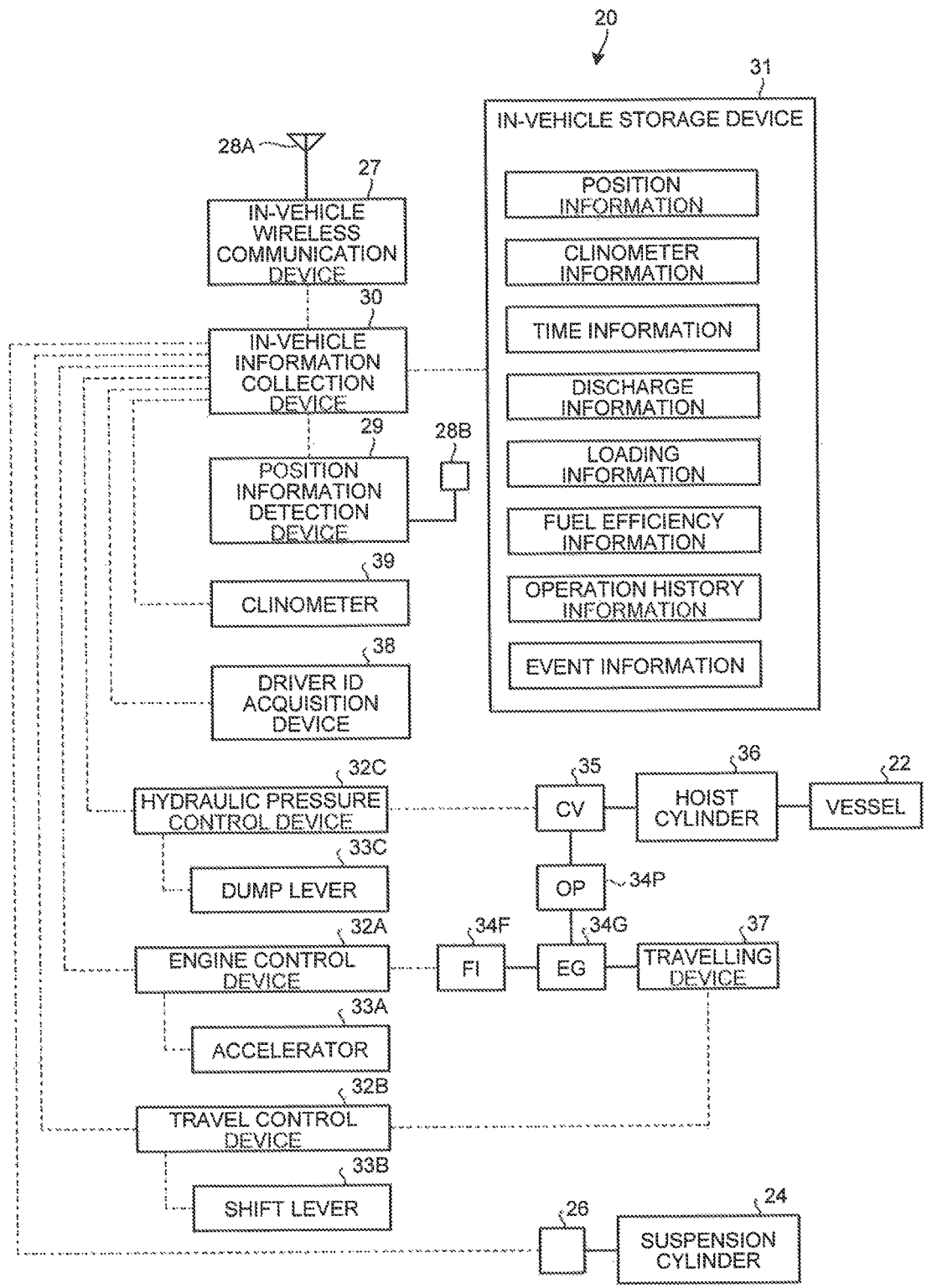
FIG. 4 is a functional block diagram illustrating an in-vehicle information collection device and a peripheral device thereof.

FIG. 4 is a functional block diagram illustrating the in-vehicle information collection device and the peripheral device thereof. The in-vehicle information collection device 30 included in the dump truck 20 is connected to an in-vehicle storage device 31, the in-vehicle wireless communication device 27, and the position information detection device 29. The in-vehicle information collection device 30 is further connected with a state acquisition device. The in-vehicle information collection device 30 is a computer in which a CPU (Central Processing Unit) is combined with a memory, for example.

The in-vehicle information collection device 30 is a device which acquires and collects information on various operating states of the dump truck 20 serving as the mining machine. The state acquisition device is the pressure sensor 26 installed in the suspension cylinder 24, various other sensors, an engine control device 32A, a travel control device 32B, a hydraulic pressure control device 32C, a driver ID acquisition device 38, and a tilt sensor (clinometer) 39, for example. The in-vehicle information collection device 30 acquires the information on the various operating states of the dump truck 20 from these state acquisition devices and collects these pieces of acquired information as the operation information.

The in-vehicle information collection device 30 can acquire information indicating the fuel injection quantity by acquiring a control amount of a fuel injector (FI) 34F from the engine control device 32A, for example. Information pertaining to fuel efficiency can be obtained from the information indicating the fuel injection quantity. The in-vehicle information collection device 30 can further acquire information indicating an operated amount of an accelerator 33A through the engine control device 32A. The operating state of a driver driving the dump truck 20 can be grasped by the information indicating the operated amount exerted to the accelerator 33A by the driver of the dump truck 20. The in-vehicle information collection device 30 can further acquire various pieces of information such as speed, coolant temperature, and lubricant pressure of the engine (EG) 34G from the engine control device 32A. The information on the speed of the engine (EG) 34G is acquired from the speed detected by a speed sensor (not shown) or the like attached to an output shaft of the engine (EG) 34G, while the various pieces of information such as the coolant temperature and the lubricant pressure are acquired by a temperature sensor or a pressure sensor not shown.

The in-vehicle information collection device 30 can obtain various pieces of information of a travelling device 37 from the travel control device 32B. The dump truck 20 adopting the mechanical drive system in the present embodiment, the travelling device 37 includes the torque converter TC and the transmission TM driven by the engine 34G illustrated in FIG. 2 as well as the drive shaft 34DS which transmits driving power from the transmission 34TM to the vehicle wheel 23 illustrated in FIG. 3. The various pieces of information of the travelling device 37 includes a speed stage shifting state and output shaft speed of the transmission 34TM described above as well as the speed of the drive shaft 34DS, for example. The in-vehicle information collection device 30 can further grasp the operating state of the driver driving the dump truck 20 by acquiring an operated position or an operated amount of a shift lever 33B through the travel control device 32B. The shift lever 33B is used when the driver instructs the travel control device 32B to move the dump truck 20 forward or backward or to change the travelling speed stage.

The in-vehicle information collection device 30 can further acquire an open/closed state of a hydraulic fluid control valve (CV) 35 from the hydraulic pressure control device 32C. In this example, the hydraulic fluid control valve 35 supplies hydraulic fluid ejected from an oil pump (OP) 34P to a hoist cylinder 36 (a hydraulic cylinder) which moves the vessel 22 up and down, and discharges the hydraulic fluid from the hoist cylinder 36, the oil pump being driven by the operation of the engine 34G. The in-vehicle information collection device 30 can therefore grasp the up-down state of the vessel 22 based on the open/closed state of the hydraulic fluid control valve 35. The vessel 22 moves up and down by a dump lever 33C operated by the driver. Accordingly, the in-vehicle information collection device 30 can also grasp the up-down state of the vessel 22 by acquiring an operated amount or an operated position of the dump lever 33C through the hydraulic pressure control device 32C.

The in-vehicle information collection device 30 can grasp the weight of the load being loaded onto the vessel 22 by acquiring the pressure acting upon the hydraulic fluid in the suspension cylinder 24, the pressure being detected by the pressure sensor 26. The mass of the load (load amount) can be found based on a measured value indicated by the pressure sensor 26 (four pressure sensors 26 when there are four vehicle wheels 23) which is included in each suspension cylinder 24 attached to each vehicle wheel 23 of the dump truck 20. Moreover, the change of pressure acting upon the hydraulic fluid in the suspension cylinder 24 as time elapses allows one to know whether the load is loaded onto the vessel 22 or being discharged or has been discharged from the vessel 22 of the dump truck 20, the pressure being detected by the pressure sensor 26.

One can determine that the load is loaded at the loading station LPA when the pressure detected by the pressure sensor 26 increases and exceeds a predetermined value (such as a value corresponding to half a prescribed load capacity of the dump truck 20), for example. On the other hand, one can determine that the load is discharged (or has been discharged) at the discharge station DPA when the pressure detected by the pressure sensor 26 decreases and falls below a predetermined value (such as a value corresponding to one-fourth of the prescribed load capacity of the dump truck 20). In addition to using the pressure detected by the pressure sensor 26, the operating state (the operated position or the operated amount) of the dump lever 33C or the position information of the dump truck 20 and the like can be used at the same time to determine whether the load is discharged or loaded, so that the loaded state of the load onto the vessel 22 can be determined with improved accuracy. Note that the determination related to the discharging operation may be made solely based on the operating state of the dump lever 33C.

The driver ID acquisition device 38 is a device which acquires a driver ID specifying the driver of the dump truck 20. The dump truck 20 is sometimes driven by a plurality of drivers taking turns. The driver ID can be acquired from an ID key (an electronic key in which personal identification information is stored) of an individual driver or an ID card (a card in which the personal identification information is stored) of the individual driver, for example. In this case, a magnetic reading device, a wireless communication device or the like is employed as the driver ID acquisition device 38. The driver ID can also be acquired by including, as the driver ID acquisition device 38, a fingerprint authentication device and performing fingerprint authentication between a fingerprint of the driver stored in advance and a fingerprint of the individual driver. Moreover, the driver ID can be acquired by verifying ID information (personal identification information such as a personal identification number) of the individual driver, who inputs his own ID information by an input device, with ID information that is stored in advance. The driver ID acquisition device 38 is an ID key-/ID card-reading device, the fingerprint authentication device, or an ID information input device as described above, and may be provided in the vicinity of a driver seat in a cab of the dump truck 20 or at any location of the vehicle body 21 that the driver approaches when accessing the cab. Note that the driver ID of the driver getting on each dump truck 20 is in some cases transmitted from the management device 10 to the dump truck 20 via wireless communication according to a daily production schedule in the mine. In this case, the in-vehicle wireless communication device 27 also serves as the driver ID acquisition device 38. One can specify which driver is driving the dump truck 20 by the driver ID acquired by the driver ID acquisition device 38.

The tilt sensor 39 detects the tilt of the dump truck 20. The tilt sensor 39 can detect a tilt in a longitudinal direction as well as a width direction of the dump truck 20. The slope or ruggedness of a road surface traveled by the dump truck 20 can thus be detected by the tilt sensor 39.

The in-vehicle storage device 31 is formed of a RAM (Random Access Memory), a ROM (Read Only Memory), a flash memory or hard disk drive, or a combination of these. The in-vehicle storage device 31 stores the computer program in which a command provided for the in-vehicle information collection device 30 to collect the operation information is described as well as various set values to operate the mining machine management system 1. The in-vehicle information collection device 30 reads the computer program, acquires the operation information from each state acquisition device at a predetermined timing, and temporarily stores the information in the in-vehicle storage device 31. At this time, the in-vehicle information collection device 30 may perform statistical processing to find a mean, a mode, or a standard deviation of information under the same item.

The in-vehicle storage device 31 stores as the operation information the position information, clinometer information, time information, discharge information, loading information, fuel efficiency information, operation history information, event information, and the like. The event information corresponds to abnormal driving information, vehicle error information, specific drive operation information, and the like. These pieces of operation information stored in the in-vehicle storage device 31 are illustrated as an example and are not limited to what is described. The position information, the clinometer information, the discharge information, the loading information, the fuel efficiency information, the operation history information, the event information, and the like are stored in the in-vehicle storage device 31 in association with time at which each of these occurs (or is acquired by the in-vehicle information collection device 30). The in-vehicle information collection device 30 receives, through the in-vehicle wireless device 27, a command signal indicating a request from the management device 10 illustrated in FIG. 2 and transmits, through the in-vehicle wireless communication device 27 as well, the operation information stored in the in-vehicle storage device 31 to the management device 10.

Figure 5:
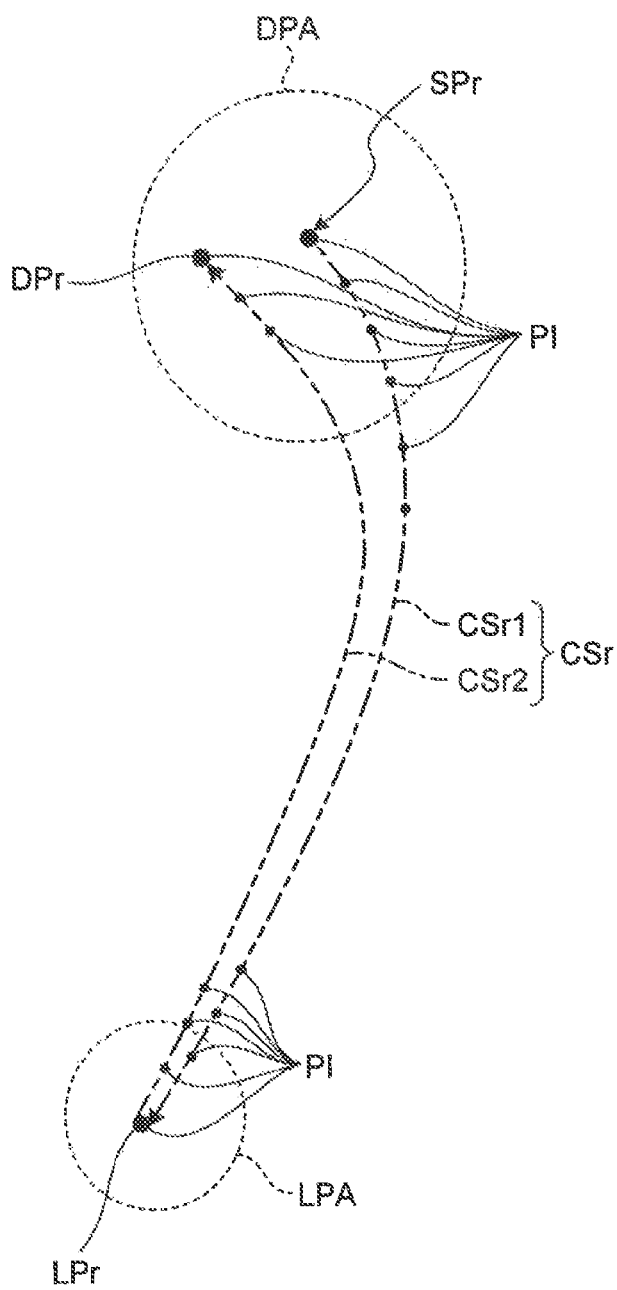
FIG. 5 is a diagram illustrating an example of a route traveled by a dump truck.

FIG. 5 is a diagram illustrating an example of the route traveled by the dump truck 20. The dump truck 20 travels toward the loading station LPA after unloading at the discharge station DPA illustrated in FIG. 5. The loading mining machine such as the excavator loads the vessel 22 of the dump truck 20 having arrived at the loading station LPA. The loaded dump truck 20 then travels toward the discharge station DPA. The dump truck 20 having arrived at the discharge station DPA unloads thereat. Now, a series of operations performed by the dump truck 20 departing for the loading station LPA from a predetermined location, being loaded at the loading station LPA, and arriving at the discharge station DPA to be unloaded is treated as a single cycle of a transporting operation performed by the dump truck 20. The predetermined location from which the dump truck 20 departs for the loading station LPA is referred to as the first position, the loading station LPA is referred to as the second position, and the position at which the truck is unloaded at the discharge station DPA is referred to as the third position. The first position in the present embodiment may be a predetermined position within the discharge station DPA or a predetermined position different from the discharge station DPA.

Within a route (hereinafter referred to as an actual travel route, as appropriate) CSr traveled by the dump truck 20 in the single cycle of the transporting operation, a route taken by the dump truck 20 from a travel starting position SPr as the first position to a loading position LPr as the second position at which the truck is loaded at the loading station LPA is referred to as an outbound route CSr1. Also within the actual travel route CSr, a route taken by the dump truck 20 from the loading position LPr as the second position to a discharging position DPr as the third position at which the truck is unloaded at the discharge station DPA is referred to as an inbound route CSr2. The outbound route CSr1 includes the travel starting position SPr as a starting point and the loading position LPr as an end point. The inbound route CSr2 includes the loading position LPr as a starting point and the discharging position DPr as an end point.

The position information detection device 29 mounted to the dump truck 20 finds position information PI of the dump truck 20 while the dump truck 20 departs the travel starting position SPr, arrives at the loading position LPr, and thereafter reaches the discharging position DPr. The position information detection device 29 acquires current position information of the dump truck 20 every predetermined time (such as one second) and stores the information in the in-vehicle storage device 31, for example. A group of a plurality of pieces of position information PI (hereinafter referred to as a position information group, as appropriate) acquired by the position information detection device 29 is included in the actual travel route CSr of the dump truck 20. As a result, the actual travel route CSr can be represented by the plurality of pieces of position information PI.

The actual travel route CSr in the present embodiment may be the first route (hereinafter referred to as a registered route, as appropriate) that is already stored (registered) in the management-side storage device 13 since the route is already traveled by another or the own dump truck 20 or is preset, or may be a route that the dump truck 20 travels for the first time. The management-side processing device 12 illustrated in FIG. 2 executes a route specification process according to the present embodiment and determines whether the actual travel route CSr is the registered route, partially the registered route, or a new route, for example. Next, an example of a process of specifying the route traveled by the dump truck 20 (the route specification process) in the mining machine management method according to the present embodiment will be described. The route specification process is executed by the management-side processing device 12 included in the management device 10 illustrated in FIG. 2 in the present embodiment, but may be executed by the in-vehicle information collection device 30 illustrated in FIG. 4.

<Example of Route Specification Process>

Figure 6:
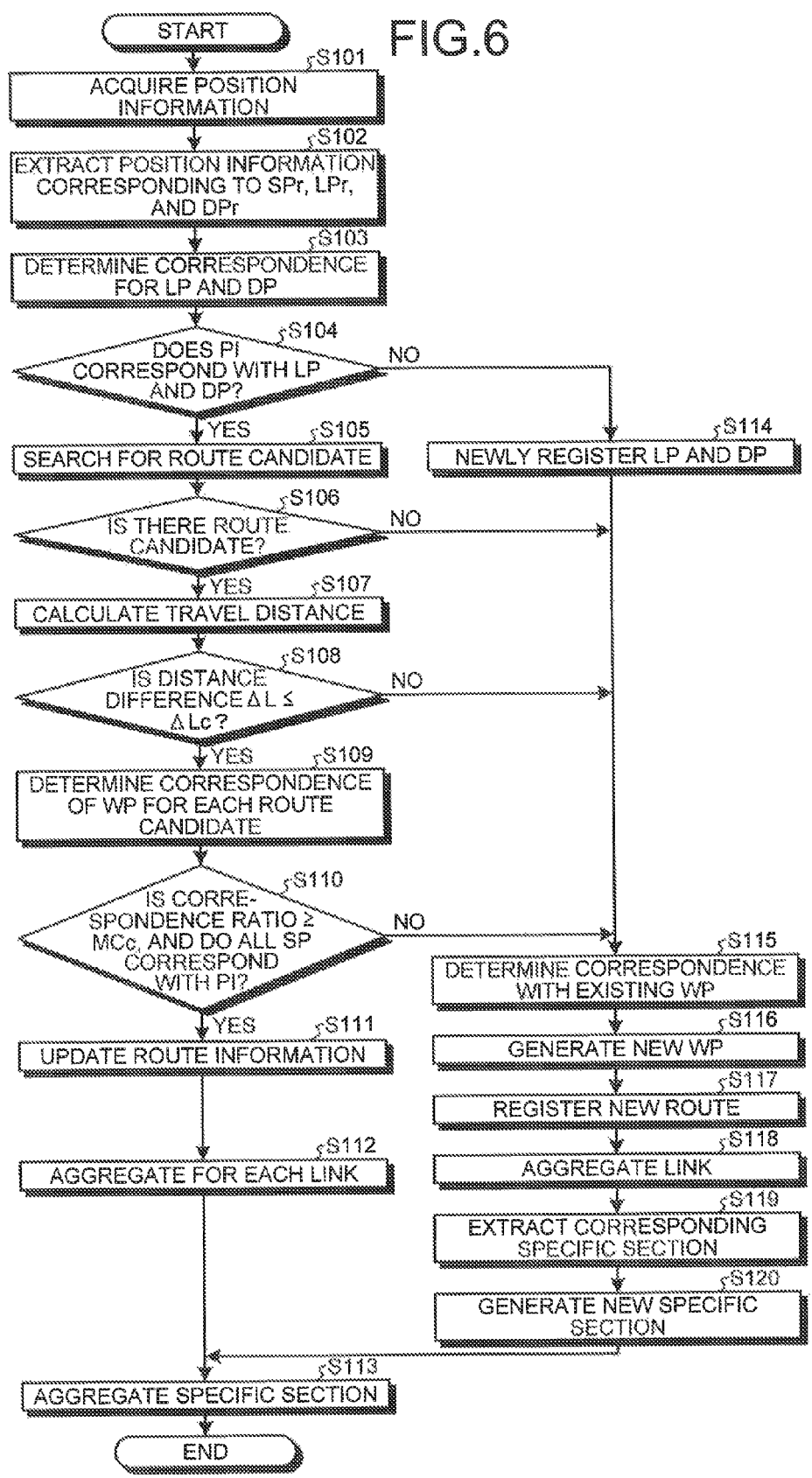
FIG. 6 is a flowchart illustrating an example of a procedure in a route specification process according to the present embodiment.

FIG. 6 is a flowchart illustrating an example of a procedure in the route specification process according to the present embodiment. In the route specification process according to the present embodiment, the management-side processing device 12, more specifically the route determination unit 12a acquires in step S101 the position information PI of the actual travel route CSr traveled by the dump truck 20, the route of which is to be specified, through the management-side wireless communication device 18 as well as the in-vehicle wireless communication device 27 and the position information detection device 29 illustrated in FIG. 4. The management-side processing device 12 acquires the actual travel route CSr traveled by each dump truck 20 through the in-vehicle information collection device 30 and stores it in the management-side storage device 13, for example.

Next, the process proceeds to step S102 where the route determination unit 12a extracts, from the acquired position information PI, first position information corresponding to the travel starting position SPr as the first position, second position information corresponding to the loading position LPr as the second position, and third position information corresponding to the discharging position DPr as the third position. The first position information can be an initial position of the position information PI included in the actual travel route CSr, for example. Among the position information PI included in the actual travel route CSr, the second position information can be a position at which the load amount obtained based on the pressure on the hydraulic fluid in the suspension cylinder 24 is greater than or equal to a predetermined value, for example, the pressure being detected by the pressure sensor 26. Among the position information PI included in the actual travel route CSr, the third position information can be a position at which the dump lever 33C illustrated in FIG. 4 is operated to the discharging side.

The information on the load amount as well as the information that the dump lever 33C is operated to the discharging side as described above are included in the operation information of the dump truck 20 collected by the in-vehicle information collection device 30 of the dump truck 20, for example. For example, the management-side processing device 12 stores, into the management-side storage device 13 or the like, the information on the load amount as well as the information that the dump lever 33C is operated to the discharging side by associating each information with the corresponding position information PI. As a result, the route determination unit 12a can extract the travel starting position SPr, the loading position LPr, and the discharging position DPr in step S102.

Next, the process proceeds to step S103 where the route determination unit 12a determines, as a first condition, whether or not the first position information corresponding to the travel starting position SPr, the second position information corresponding to the loading position LPr, and the third position information corresponding to the discharging position DPr that are extracted in step S102 correspond with the loading position (registered loading position) LP and the discharging position DP in the registered route described in the LP/DP database 14RD of the management-side storage device 13. The information described in the LP/DP database 14RD of the management-side storage device 13 is generated by the management-side processing device 12, more specifically the route information generation unit 12d, based on the position information included in the actual travel route CSr, namely the registered route, that is already traveled by the dump truck 20. The information on the registered route stored in the management-side storage device 13 will now be described.

Figure 7:
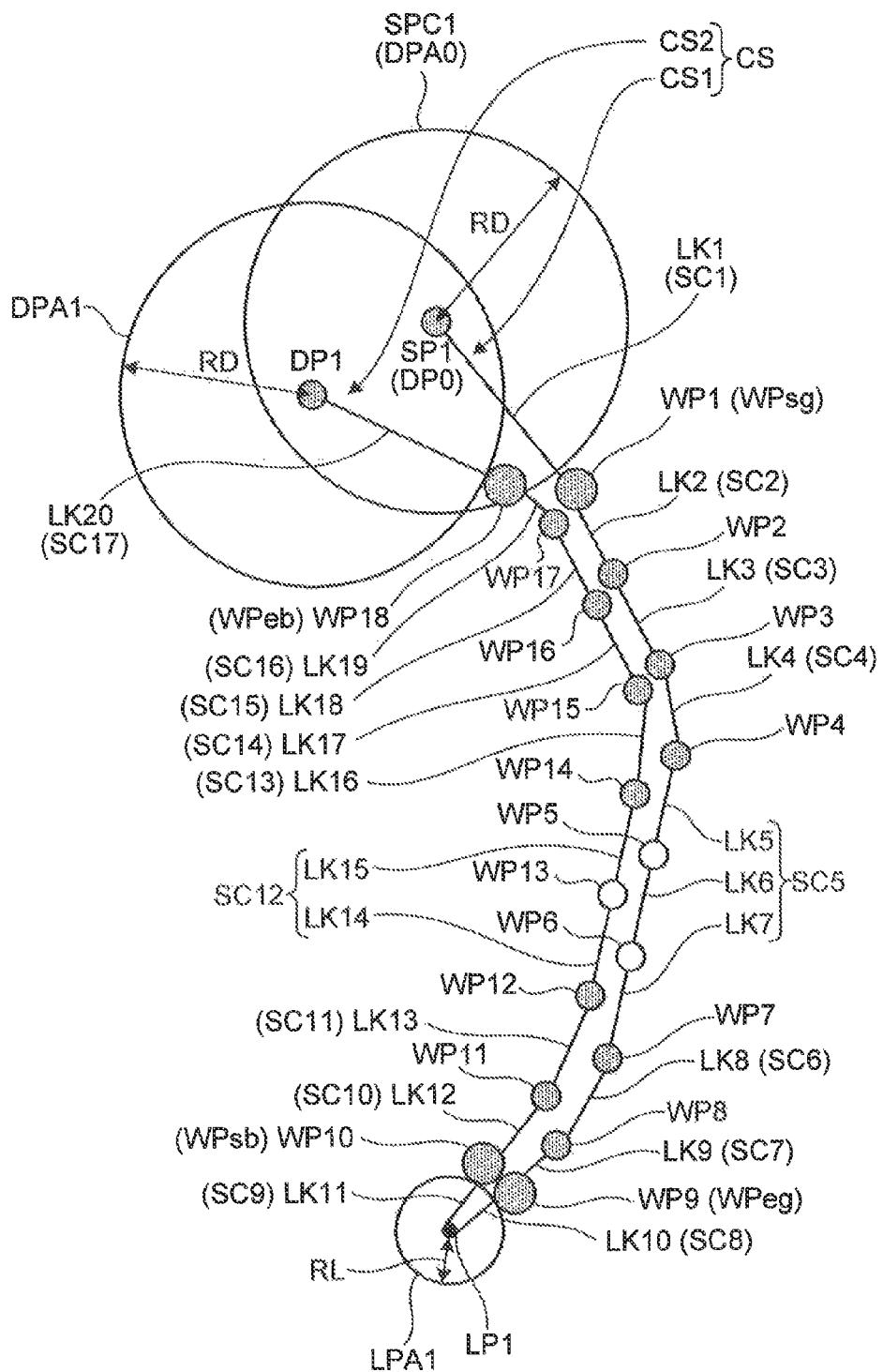
FIG. 7 is a diagram illustrating information on a registered route.

FIG. 7 is a diagram illustrating the information on the registered route. A registered route CS includes an outbound route CS1 and an inbound route CS2. The outbound route CS1 has a travel starting position SP1 as a starting point and a loading position LP1 as an end point. The inbound route CS2 has the loading position LP1 as a starting point and a discharging position DP1 as an end point. The registered route CS includes the travel starting position SP1, the loading position LP1, the discharging position DP1, and a plurality of passing positions WP1 (WPsg), WP2 to WP9 (WPeg), WP10 (WPsb), and WP11 to WP18 (WPeb) as a plurality of nodes, and links LK1 and LK2 to LK20 connecting these nodes. In the registered route CS, the travel starting position SP1 corresponds to the first position, the loading position LP1 corresponds to the second position, and the discharging position DP1 corresponds to the third position.

Each node, namely, each of the travel starting position SP1, the loading position LP1, the discharging position DP1 and the plurality of passing positions WP1 (WPsg) and WP2 to WP9 (WPeg), corresponds to each position information PI included in the actual travel route CSr. The node is a location indicated by a predetermined coordinate including the latitude, the longitude, and the altitude on the registered route CS. Each of the links LK1 and LK2 to LK20 connects the nodes adjacent to each other. The outbound route CS1 of the registered route CS illustrated in FIG. 7 includes the travel starting position SP1, the loading position LP1, the plurality of passing positions WP1 and WP2 to WP9 located therebetween, and the links LK1 and LK2 to LK10.

The inbound route CS2 includes the loading position LP1, the discharging position DP1, the plurality of passing positions WP10 and WP11 to WP18 located therebetween, and the links LK11 and LK12 to LK20. The registered route CS is a route actually traveled by the dump truck 20 when it performs the single cycle of transporting operation. In this case, the travel starting position SP1 corresponds to a discharging position DP0 at which the dump truck 20 is actually unloaded within a discharge station (hereinafter referred to as a first discharge station, as appropriate) DPA0 where the truck is unloaded before heading to the loading position LP1.

The discharge station DPA0 in the present embodiment is a range (a first predetermined range or a first range on the discharge side) SPC1 with a predetermined radius RD centered around the travel starting position SP1. Likewise, a discharge station (hereinafter referred to as a second discharge station, as appropriate) DPA1 is a range (a second predetermined range or the first range on the discharge side) with a predetermined radius RD centered around the discharging position DP1 at which the dump truck 20 loaded at the loading position LP1 is unloaded. A loading station LPA1 is a range (a first range or a first range on the loading side) with a predetermined radius RL centered around the loading position (registered loading position) LP1. Accordingly, in the present embodiment, the shape of each of the discharge station DPA0, the discharge station DPA1, and the loading station LPA1 is a circle but is not limited thereto.

That is, the predetermined range (the first predetermined range) SPC1 around the travel starting position SP1 serves as the discharge station DPA0. Likewise, the predetermined range (the second predetermined range) around the discharging position DP1 at which the dump truck 20 loaded at the loading position LP1 is unloaded serves as the discharge station (hereinafter referred to as the second discharge station, as appropriate) DPA1. Moreover, the predetermined range around the loading position LP1 serves as the loading station LPA1.

The travel starting position SP1 (the discharging position DP0) is a representative position representing the discharge station DPA0, while the discharging position DP1 is a representative position representing the discharge station DPA1. As described later on, the travel starting position SP1 (the discharging position DP0) and the discharging position DP1 change as the information on the position at which the dump truck 20 is unloaded accumulates. The loading position LP1 changes according to the information on the position at which the dump truck 20 is loaded.

The registered route CS includes the node or the passing positions WP1 and WP2 to WP18 at every predetermined distance. The predetermined distance equals 100 m, for example, but is not limited thereto in the present embodiment. The passing position WP1 (WPsg) closest to the discharge station DPA0 on the outbound route CS1 is set outside the discharge station DPA0, while the passing position WP18 (WPeb) closest to the discharge station DPA1 on the inbound route CS2 is set outside the discharge station DPA1. The passing position WP9 (WPeg) closest to the loading station LPA1 on the outbound route CS1 is set outside the loading station LPA1, while the passing position WP10 (WPsb) closest to the loading station LPA1 on the inbound route CS2 is set outside the loading station LPA1. In other words, the passing positions WP1 and WP2 to WP18 included in the registered route CS are set outside the discharge stations DPA0 and DPA1 and the loading station LPA1.

The registered route CS includes a plurality of specific sections SC1 and SC2 to SC17 in the example illustrated in FIG. 7. Each of the specific sections SC1 and SC2 to SC17 is a part where a characteristic such as a bearing and a slope is considered identical within the registered route CS. A specific section including a plurality of links is a part within the registered route CS where a slope difference between the links adjacent to each other falls within a predetermined value, a bearing difference between the links adjacent to each other falls within a predetermined value, and there is no node to be an intersection between those links. For example, the adjacent three links LK5, LK6, and LK7 included in the specific section SC5 have slopes that fall within the range where they are considered approximately identical or slopes, the difference in which falls within the predetermined value. The three links have bearings, the difference in which falls within the predetermined value, and have no intersection among the links. The middle nodes in the specific section SC5, namely, the passing positions WP5 and WP6, are each indicated by a white circle in FIG. 7 and are not intersections. The same as the specific section SC5 can be said about the specific section SC12. The specific section includes only one link when the slope difference and the bearing difference between the links adjacent to each other do not satisfy the aforementioned condition. The specific section SC2 corresponding to the link LK2 is a specific section having one link, for example. As described later on, the number of travels, travel time, the operation information and the like are aggregated in every specific section in the present embodiment. By using the specific sections SC1 and SC2 to SC17, the operating state of the plurality of dump trucks 20 can be compared and evaluated while having the state of the road surface traveled by the dump truck 20 as the identical condition.

The loading position LP1 and the discharging positions DP0 and DP1 are described in the LP/DP database 14RD stored in the management-side storage device 13. Also described in the LP/DP database 14RD in addition to the loading position LP1 and the discharging positions DP0 and DP1 is information on the ranges (the discharge stations DPA0 and DPA1) with the predetermined radius RD centered around each of the discharging positions DP0 and DP1 and the range (the loading station LPA1) with the predetermined radius RL centered around the loading position LP1. The passing positions WP1 and WP2 to WP18 are described in the route-specific WP database 14WP stored in the management-side storage device 13. The specific sections SC1 and SC2 to SC17 are described in the route-specific specific section database 14SC stored in the management-side storage device 13. In specifying the actual travel route CSr of the dump truck 20, the route determination unit 12a acquires the information from the LP/DP database 14RD and the route-specific WP database 14WP, and compares the information with the position information PT included in the actual travel route CSr.

In step S103, the route determination unit 12a acquires the loading position LP and the discharging position DP of the registered route CS from the LP/DP database 14RD included in the management-side storage device 13. The route determination unit 12a then compares the loading position LP and the discharging position DP on the registered route CS being acquired with the first position information corresponding to the travel starting position SPr, the second position information corresponding to the loading position LPr, and the third position information corresponding to the discharging position DPr that are extracted in step S102. In the present embodiment, the area within the range with the predetermined radius RD centered around each of the discharging positions DP (DP0 and DP1) corresponds to the discharge stations DPA0 and DPA1, respectively. The area within the range with the predetermined radius RL centered around the loading position LP corresponds to the loading station LPA1. Accordingly, the route determination unit 12a determines that the first position information corresponds with the discharging position DP0 already registered in the LP/DP database 14RD when the first position information corresponding to the travel starting position SPr and extracted in step S102 is located within the discharge station already registered, namely, the range SPC1 with the predetermined radius RD centered around the discharging position DP (the discharging position DP0 in the example illustrated in FIG. 7) that is described in the LP/DP database 14RD. Likewise, the route determination unit 12a determines that the second position information corresponds with the loading position LP1 already registered in the LP/DP database 14RD when the second position information corresponding to the loading position LPr and extracted in step S102 is located within the range with the predetermined radius RL centered around the loading position LP (the loading position LP1 in the example illustrated in FIG. 7). The route determination unit 12a further determines that the third position information corresponds with the discharging position DP1 already registered in the LP/DP database 14RD when the third position information corresponding to the discharging position DPr and extracted in step S102 is located within the range with the predetermined radius RD centered around the discharging position DP (the discharging position DP1 in the example illustrated in FIG. 7).

The route determination unit 12a searches for a route candidate identical to the actual travel route CSr in step S105 when the first position information corresponding to the travel starting position SPr, the second position information corresponding to the loading position LPr, and the third position information corresponding to the discharging position DPr that are extracted in step S102 correspond with the loading position LP and the discharging position DP of the registered route CS described in the LP/DP database 14RD of the management-side storage device 13 (step S104; Yes). Described for each registered route CS in the registered route database 14CS are the discharging position DP0 (the travel starting position SP1) at the first discharge station DPA0, the loading position LP1, the discharging position DP1 at the second discharge station DPA1, the passing positions WP1, WP2 and the like, the links LK1, LK2 and the like that are all included in the registered route CS. From the registered route database 14CS of the management-side storage device 13, the route determination unit 12a extracts, as the route candidate identical to the actual travel route CSr, the registered route CS having the discharging position DP and the loading position LP that correspond with the travel starting position SPr, the loading position LPr, and the discharging position DPr extracted in step S102, for example. A plurality of the registered routes CS is sometimes extracted to be the candidate.

The route determination unit 12a then determines in step S106 whether or not the route candidate exists. The route determination unit 12a proceeds to step S107 when the route candidate exists. The route determination unit 12a proceeds to step S115 when the route candidate does not exist. In step S107, the route determination unit 12a calculates a travel distance traveled by the dump truck 20 on the actual travel route CSr and the registered route CS that is searched for and extracted in step S105. The travel distance is calculated for each of the outbound route CSr1 and the inbound route CSr2. The route determination unit 12a calculates the distance from the travel starting position SPr to the loading position LPr as the travel distance on the outbound route CSr1 of the actual travel route CSr. Moreover, the route determination unit 12a calculates the distance from the loading position LPr to the discharging position DPr as the travel distance on the inbound route CSr2 of the actual travel route CSr. The sum of the travel distance on the outbound route CSr1 and the travel distance on the inbound route CSr2 equals the travel distance on the actual travel route CSr.

In calculating the travel distance on the outbound route CS1 of the registered route CS, the route determination unit 12a calculates the distance from the passing position WP1 (WPsg) closest to the first discharge station DPA0 including the travel starting position SP1 to the passing position WP9 (WPeg) closest to the loading station LPA1 including the loading position LP1. In calculating the travel distance on the inbound route CS2 of the registered route CS, the route determination unit 12a calculates the distance from the passing position WP10 (WPsb) closest to the loading station LPA1 including the loading position LP1 to the passing position WP18 (WPeb) closest to the second discharge station DPA1 including the discharging position DP1. The sum of the distance on the outbound route CS1 and the distance on the inbound route CS2 equals the travel distance on the registered route CS. The route determination unit 12a calculates the travel distance for each registered route CS when the plurality of registered routes CS is extracted to be the candidate.

Letting a distance difference $\Delta L$ be the absolute value of a difference between the travel distance on the actual travel route CSr and the travel distance on the registered route CS, the route determination unit 12a compares the distance difference $\Delta L$ with a predetermined threshold $\Delta Lc$ in step S108. As a result, the route determination unit 12a proceeds to step S109 when it holds true as a second condition that the distance difference $\Delta L$ is smaller than or equal to the predetermined threshold $\Delta Lc$, that is, the distance difference $\Delta L$ is within a predetermined range specified by the predetermined threshold $\Delta Lc$ (step S108; Yes).

Although not limited, the threshold $\Delta Lc$ of the distance difference in the present embodiment is approximately 200 m, for example. Each dump truck 20 operating in the mine travels a different travel distance in some cases as a result of avoiding an obstacle or the like, even when the dump truck 20 travels the same route, for example. The distance difference $\Delta L$ can be determined in consideration of an actual operating condition of the dump truck 20 in the mine by setting the $\Delta Lc$ equal to approximately 200 m.

In step S109, the route determination unit 12a determines whether or not the position information PI on the actual travel route CSr corresponds with the passing position WP on the registered route CS to be the candidate. More specifically, the route determination unit 12a determines whether or not the plurality of pieces of position information PI as the position information group included in the actual travel route CSr corresponds with the passing positions WP1 and WP2 to WP9 as the plurality of nodes located between the travel starting position SP1 (the discharging position DP0) and the loading position LP1 as well as the passing positions WP10 and WP11 to WP18 as the plurality of nodes located between the loading position LP1 and the discharging position DP1 on the registered route CS. The route determination unit 12a determines whether the passing position WP corresponds with the position information PI for each registered route CS when there exists the plurality of registered routes CS to be the candidate.

Figure 8:
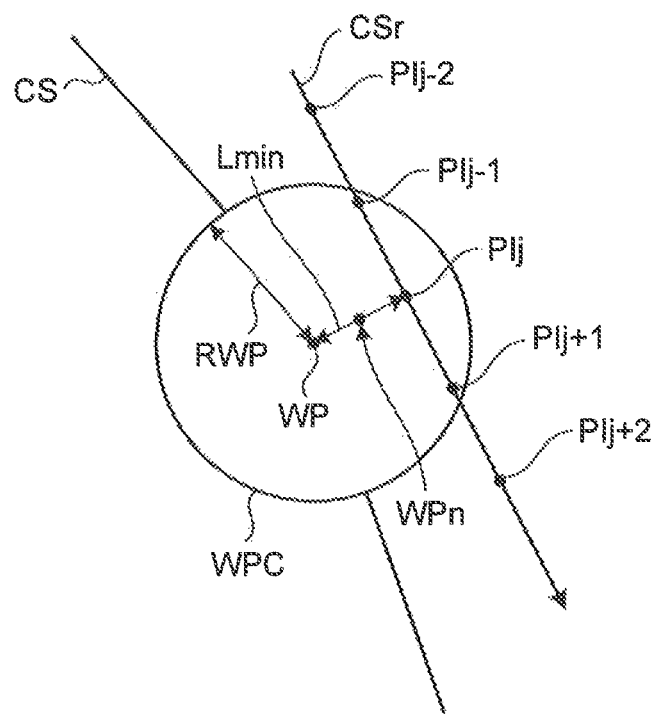
FIG. 8 is a diagram used to describe a method of determining correspondence between position information on an actual travel route and a passing position on the registered route.

FIG. 8 is a diagram provided to describe the method of determining whether the position information PI on the actual travel route CSr corresponds with the passing position WP on the registered route CS. Reference numerals in FIG. 8 including j, j−1, and j+1 (where "j" is an integer) attached to a reference numeral PI that indicates the position information are provided to distinguish the plurality of pieces of position information PT. It is simply described as position information PI when there is no need to distinguish the plurality of pieces of position information PI. In determining whether the position information PI on the actual travel route CSr corresponds with the passing position WP on the registered route CS to be the candidate, the route determination unit 12a determines that the position information PI corresponds with the passing position WP when at least one of the plurality of pieces of position information PI is located within a predetermined range WPC around the passing position WP. Three pieces of position information $PI_{j-1}$, $PI_j$, and $PI_{j+1}$ on the actual travel route CSr are located within the predetermined range WPC in the example illustrated in FIG. 8, whereby the route determination unit 12a determines that the position information PI on the actual travel route CSr corresponds with the passing position WP on the registered route CS to be the candidate. The predetermined range WP in the present embodiment is a range with a predetermined radius RWP centered around the passing position WP. That is, the shape of the predetermined range WPC is a circle but is not limited thereto.

The dump truck 20 travels a track having a certain width in order to be able to pass by oncoming traffic, for example, when travelling in the mine. The coordinate of the passing position WP and the position information PT have an error in the position measured by the GPS so that, when determining whether the position information PI corresponds with the passing position WP itself, there is a possibility that the two hardly correspond with each other not allowing the error in the position measured by the GPS at the time the dump truck 20 travels. It is adapted in the present embodiment that a third condition is satisfied when the position information PI is located within the predetermined range WPC around the passing position WP. The route determination unit 12a can thus determine the correspondence between the passing position WP and the position information PI in consideration of the width of the track and the measurement error of the GPS that occurs at the time the dump truck 20 travels. The predetermined radius RWP is determined in consideration of the width of the track and the measurement error of the GPS that occurs at the time the dump truck 20 travels. The predetermined radius RWP in the present embodiment is approximately 15 m to 30 m, for example.

Figure 9:
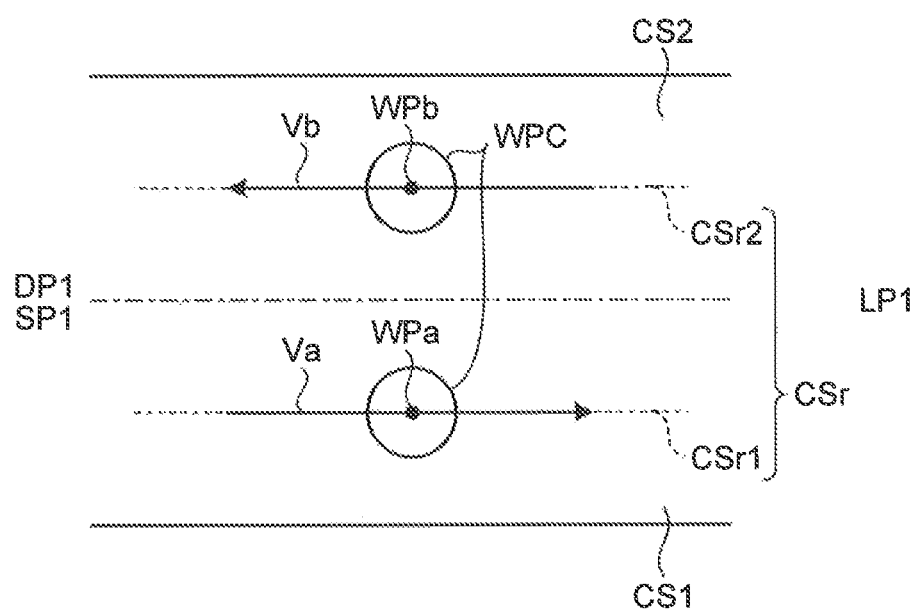
FIG. 9 is a diagram used to describe an additional matter provided to determine the correspondence between the position information on the actual travel route and the passing position on the registered route.
Figure 10:
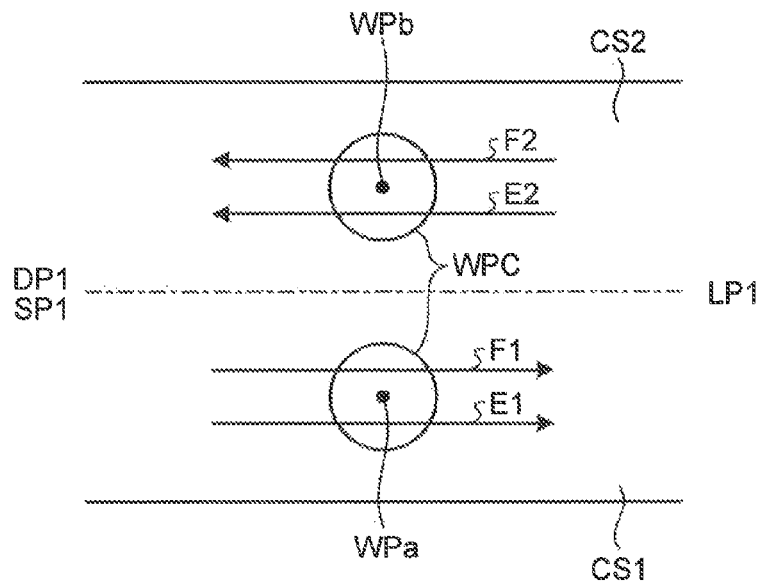
FIG. 10 is a diagram used to describe an additional matter provided to determine the correspondence between the position information on the actual travel route and the passing position on the registered route.

FIGS. 9 and 10 are diagrams each provided to describe an additional matter in determining the correspondence between the position information PI on the actual travel route CSr and the passing position WP on the registered route CS. In addition to determining whether or not the position information PI on the actual travel route CSr is located within the predetermined range WPC around the passing position WP, the correspondence between the position information PI and the passing position WP may be determined by using at least one of a travelling direction and a loaded state of the dump truck 20 in the present embodiment. As a result, the route determination unit 12a can more accurately determine the correspondence between the two.

FIG. 9 illustrates an example where the correspondence between the position information PI and the passing position WP is determined by using the travelling direction of the dump truck 20. The outbound route CS1 of the registered route CS is a route going from the travel starting position SP1 to the loading position LP1, whereas the inbound route CS2 is a route going from the loading position LP1 to the discharging position DP1. A normal travelling direction Va of the dump truck 20 travelling the outbound route CS1 is directed from the travel starting position SP1 toward the loading position LP1, while a normal travelling direction Vb of the dump truck 20 travelling the inbound route CS2 is directed from the loading position LP1 toward the discharging position DP1. The travelling directions Va and Vb of the dump truck 20 can be found from at least two pieces of position information PI each acquired at a different timing.

The normal travelling direction Va of the dump truck 20 at a passing position WPa on the outbound route CS1 of the registered route CS is directed from the travel starting position SP1 toward the loading position LP1. It is now considered a case where the position information on the actual travel route CSr is located in the predetermined range WPC around the passing position WPa on the outbound route CS1. In this case, the route determination unit 12a determines that the position information PT on the actual travel route CSr corresponds with the passing position WPa on the registered route CS when the travelling direction of the dump truck 20 at the passing position WPa is directed from the travel starting position SP1 toward the loading position LP1, the travelling direction being found from the position information PI included in the actual travel route CSr. On the other hand, the route determination unit 12a determines that the position information PI on the actual travel route CSr does not correspond with the passing position WPa on the registered route CS when the travelling direction of the dump truck 20 at the passing position WPa is directed from the loading position LP1 toward the discharging position DP1, the travelling direction being found from the position information PI included in the actual travel route CSr. The determination holds in the latter case because the travelling direction is not the normal travelling direction of the dump truck 20 which travels the outbound route CS1.

The inbound route CS2 will now be described. The normal travelling direction Vb of the dump truck 20 at a passing position WPb on the inbound route CS2 of the registered route CS is directed from the loading position LP1 toward the discharging position DP1. It is now considered a case where the position information on the actual travel route CSr is located in the predetermined range WPC around the passing position WPb on the inbound route CS2. In this case, the route determination unit 12a determines that the position information PI on the actual travel route CSr corresponds with the passing position WPb on the registered route CS when the travelling direction of the dump truck 20 at the passing position WPb is directed from the loading position LP1 toward the discharging position DP1, the travelling direction being found from the position information PI included in the actual travel route CSr. On the other hand, the route determination unit 12a determines that the position information PI on the actual travel route CSr does not correspond with the passing position WPb on the registered route CS when the travelling direction of the dump truck 20 at the passing position WPb is directed from the travel starting position SP1 toward the loading position LP1, the travelling direction being found from the position information PI included in the actual travel route CSr. The determination holds in the latter case because the travelling direction is not the normal travelling direction of the dump truck 20 which travels the inbound route CS2.

In the case where the travelling direction of the dump truck 20 found from the position information PI on the actual travel route CSr is different from the normal travelling direction on the registered route CS, the route determination unit 12a determines that the position information PI does not correspond with the passing position WP even when the position information PI is located within the predetermined range WPC around the passing position WP. As a result, the route determination unit 12a can more accurately determine the correspondence between the position information PI on the actual travel route CSr and the passing position WP on the registered route CS.

FIG. 10 illustrates an example where the correspondence between the position information PI and the passing position WP is determined by using the loaded state of the dump truck 20. The outbound route CS1 and the inbound route CS2 on the registered route CS are as described above. The dump truck 20 travelling the outbound route CS1 is not usually loaded because the outbound route CS1 is the route taken to head for the loading position LP1. The dump truck 20 travelling the inbound route CS2 is usually loaded because the inbound route CS2 is the route taken to head from the loading position LP1 to the discharging position DP1. Therefore, the dump truck 20 travelling the outbound route CS1 and the dump truck 20 travelling the inbound route CS2 have a different amount of load. That is, one can determine whether the dump truck 20 is travelling the outbound route CS1 or the inbound route CS2 according to the load amount. The load amount is found from the detected value of the pressure sensor 26 in the suspension cylinder 24 illustrated in FIG. 4, as described above.

The dump truck 20 at the passing position WPa on the outbound route CS1 of the registered route CS is headed to the loading position LP1 in an unloaded state. It is now considered a case where the position information on the actual travel route CSr is located in the predetermined range WPC around the passing position WPa on the outbound route CS1. In this case, the route determination unit 12a determines that the position information PI on the actual travel route CSr corresponds with the passing position WPa on the registered route CS when the load amount on the dump truck 20 is less than or equal to a predetermined value (E1 in FIG. 10), or when the load is absent. On the other hand, the route determination unit 12a determines that the position information PI on the actual travel route CSr does not correspond with the passing position WPa on the registered route CS when the load amount on the dump truck 20 is greater than the predetermined value (F1 in FIG. 10), or when the load is present. The determination holds in the latter case by determining that the dump truck 20 is the one travelling the outbound route CS1 in an opposite direction or the one travelling a route different from the registered route CS because the dump truck 20 is loaded even though it is headed to the loading position LP1.

The inbound route CS2 will now be described. The dump truck 20 at the passing position WPb on the inbound route CS2 of the registered route CS is headed to the discharging position DP1 in a loaded state. It is now considered a case where the position information on the actual travel route CSr is located in the predetermined range WPC around the passing position WPb on the inbound route CS2. In this case, the route determination unit 12a determines that the position information PI on the actual travel route CSr corresponds with the passing position WPb on the registered route CS when the load amount on the dump truck 20 is greater than the predetermined value (F2 in FIG. 10). On the other hand, the route determination unit 12a determines that the position information PI on the actual travel route CSr does not correspond with the passing position WPb on the registered route CS when the load amount on the dump truck 20 is less than or equal to the predetermined value (E2 in FIG. 10). The determination holds in the latter case by determining that the dump truck 20 is the one travelling the inbound route CS2 in an opposite direction or the one travelling a route different from the registered route CS because the dump truck 20 is unloaded even though it is headed to the discharging position DP1.

The route determination unit 12a thus determines whether or not the position information PI corresponds with the passing position WP based on the loaded state of the dump truck 20 when the position information PI is located within the predetermined range WPC around the passing position WP. As a result, the route determination unit 12a can more accurately determine the correspondence between the position information PI on the actual travel route CSr and the passing position WP on the registered route CS.

When the passing position WP corresponds with the position information PI, the route determination unit 12a corrects the passing position WP by using the position information PI located within the predetermined range WPC around the passing position WP. The route determination unit 12a in this case uses the position information PI that has the shortest distance to the passing position WP that is not yet corrected. Among the plurality of pieces of position information PIj−1, PIj, and PIj+1 within the predetermined range WPC in the example illustrated in FIG. 8, the position information PIj having the shortest distance to the uncorrected passing position WP is used to correct the passing position WP. In correcting the passing position WP, the route determination unit 12a determines the middle point of a distance Lmin between the passing position WP and the position information PIj to be a corrected passing position WPn, for example. The route determination unit 12a rewrites the uncorrected passing position WP that is described in the route-specific WP database 14WP of the management-side storage device 13 into the corrected passing position WPn. The route-specific WP database 14WP is updated as a result. The error in the passing position WP can be made small as the number of actual travel routes CSr increases by correcting the passing position WP with the use of the position information PIj on the actual travel route CSr.

In step S110, the route determination unit 12a determines whether or not a correspondence ratio between the position information PI on the actual travel route CSr and the passing position WP on the registered route CS is greater than or equal to a predetermined threshold MCc as well as the passing position on each of both ends of the specific section SC corresponds with the position information PI on the actual travel route CSr in all specific sections SC as the third condition. Note that the third condition need only include, at least, that the correspondence ratio between the position information PI on the actual travel route CSr and the passing position WP on the registered route CS is greater than or equal to the predetermined threshold MCc. The correspondence ratio is the ratio of the passing position WP on the registered route CS corresponding with the plurality of pieces of position information PI included in the actual travel route CSr. The dump truck 20 sometimes detours around a part of a track on the same track depending on the condition of the track such as wet (rain) or dry, or whether or not there is an obstacle. There is also the problem of measurement error of the GPS as described above. Accordingly, the present embodiment determines whether the third condition is satisfied by using the predetermined threshold MCc in consideration of the detour and the error in the measured position. The route determination unit 12a can thus determine whether or not the actual travel route CSr corresponds with the registered route CS in consideration of variation of the actual travel and the error in the measured position.

The correspondence ratio equals N1/N2 where N1 is the number of passing positions WP on the registered route CS corresponding with the position information PI on the actual travel route CSr and N2 is the number of passing positions WP included in the registered route CS that is targeted for the determination. The predetermined threshold MCc in the present embodiment is approximately 0.8 to 0.9, for example, but is not limited thereto. The predetermined threshold MCc may be changed according to the condition (such as whether it is rainy or dry) or the shape (such as the degree of curvature or slope) of the track traveled by the dump truck 20, for example. The route determination unit 12a can therefore determine whether the third condition is satisfied in consideration of the actual track because there is a case where the dump truck 20 detours around a part of the track depending on the road condition even when travelling the same track.

Figure 11:
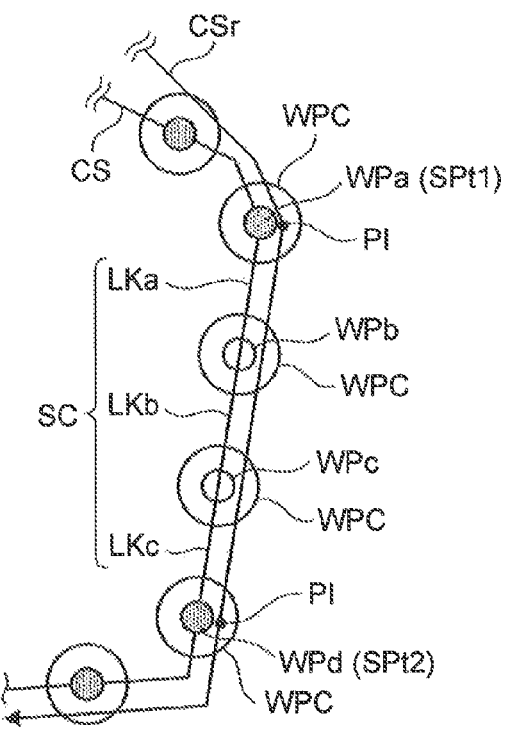
FIG. 11 is a diagram used to describe determination of correspondence between position information PI on an actual travel route and a passing position on a registered route in a specific section.

FIG. 11 is a diagram provided to describe determination of correspondence between the position information PI on the actual travel route CSr and the passing position WP on the registered route CS in the specific section. The specific section SC illustrated in FIG. 11 includes passing positions WPa, WPb, WPc, and WPd as nodes and links LKa, LKb, and LKc. The passing positions WPa and WPd located at both ends of the specific section SC are referred to as specific section positions SPt1 and SPt2, respectively. When the specific section SC on the registered route CS corresponds with a part of the actual travel route CSr, one can determine that the correspondent part highly possibly has the same characteristic since, as described above, the specific section SC is the part of the registered route CS where the characteristic is considered substantially identical. Accordingly, the route determination unit 12a in the present embodiment determines that the third condition is satisfied when the specific section positions SPt1 and SPt2 of the specific section SC correspond with the position information PI on the actual travel route CSr in all the specific sections SC. The accuracy of determining whether or not the actual travel route CSr corresponds with the registered route CS can be improved as a result. The determination of whether or not the specific section positions SPt1 and SPt2 correspond with the position information PI on the actual travel route CSr is similar to the determination of whether or not the passing position WP corresponds with the position information PI.

When the third condition is satisfied (step S110; Yes), the route determination unit 12a determines that the actual travel route CSr is identical to the registered route CS. In this case, the route determination unit 12a in step S111 updates the route information, specifically the route information of the registered route CS stored in the management-side storage device 13. For example, the route determination unit 12a updates at least one of the number of travels, travel time, and operation information of the dump truck 20 travelling the registered route CS that is determined to be identical. The number of travels is updated by adding 1 to the current number of times. The number of times the dump truck has traveled the registered route CS can be updated as a result. The route determination unit 12a also updates the route information, specifically the route information of the registered route CS stored in the management-side storage device 13 when the specific section SC on the actual travel route CSr corresponds with the specific section SC on the registered route CS, or when a new specific section SC is generated. For example, the route determination unit 12a updates at least one of the number of travels, travel time, and operation information of the dump truck 20 travelling the specific section SC determined to be identical or the specific section SC generated anew.

When determining that the actual travel route CSr is identical to the plurality of registered routes CS, the route determination unit 12a updates at least one of the number of travels, travel time, and operation information of the dump truck 20 travelling the latest registered route CS in updating the route information. There is a case where at least one of the travel starting position SPr, the loading position LPr, and the discharging position DPr does not correspond even when the actual travel route CSr corresponds with the passing position WP on the registered route CS, the case resulting from the shift of at least one of the discharge station DPA and the loading station LPA along time. In this case, the management-side processing device 12 generates new route information by using the position information PI on the actual travel route CSr and registers the route information as the registered route CS into the registered route database 14CS or the like of the management-side storage device 13. The registered route CS includes the one used in the past but not used anymore and the latest one currently used, when it is determined that the actual travel route CSr is identical to the plurality of registered routes CS. In this case, the route determination unit 12a can update the route information of the latest registered route CS currently being used by updating at least one of the number of travels, the travel time, and the operation information of the dump truck 20 travelling the latest registered route CS as is the case with the present embodiment.

There is sometimes a timing delay for the management-side processing device 12 to acquire the position information PI on the actual travel route CSr due to communication delay, for example. It is possible in such case that the registered route CS cannot be updated with the latest information. In updating the route information in the present embodiment, the route determination unit 12a does not update the number of travels and the travel time of the dump truck 20 travelling the registered route CS that is determined to be identical to the actual travel route CSr, when the travel time of the dump truck 20 travelling the actual travel route CSr precedes the last-updated time of the registered route CS that is determined to be identical to the actual travel route CSr. The registered route CS is updated with the latest information as a result.

Once the route information on the registered route CS is updated, the process proceeds to step S112 where at least one of the number of travels, the travel time, and the operation information is aggregated and updated for each link of the registered route CS that is determined to be identical to the actual travel route CSr in step S110. In step S113 as illustrated in FIG. 6, the route analysis unit 12e of the management-side processing device 12 aggregates the specific section SC based on the route information on the registered route CS or the like acquired by the process that is performed up to this point. The process performed in step S113 will be described later on. Now, the process will be described by referring back to step S104 illustrated in FIG. 6.

There is no registered route CS that corresponds with the actual travel route CSr when at least one of the first position information corresponding to the travel starting position SPr, the second position information corresponding to the loading position LPr, and the third position information corresponding to the discharging position DPr that are extracted in step S102 does not correspond with the loading position LP or the discharging position DP on the registered route CS (step S104; No). The route determination unit 12a proceeds to step S114 in this case. In step S114, the route determination unit 12a registers the position information of the position having no correspondence as a new discharging position DP or a new loading position LP. Next, the new registration of at least one of the discharging position DP and the loading position LP will be described along with a case where no position is newly registered.

Figure 12:
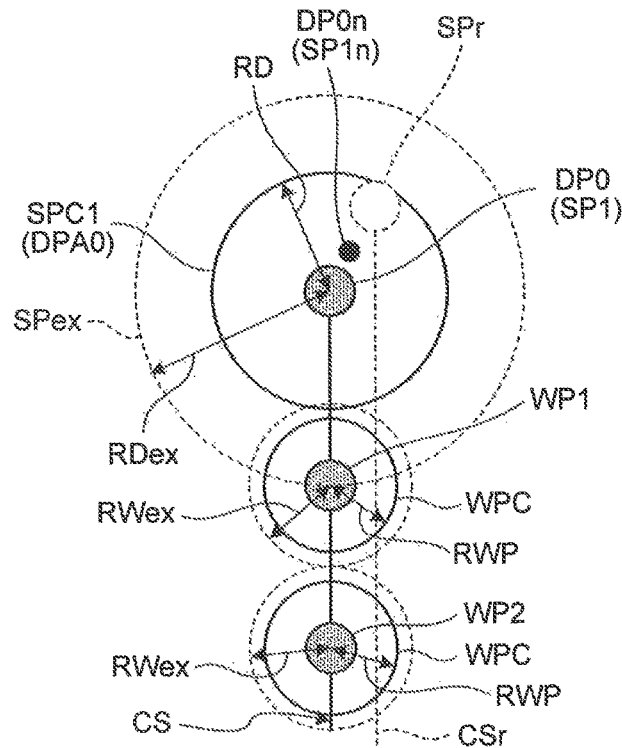
FIG. 12 is a diagram used to describe a case where a discharging position is not newly registered.
Figure 13:
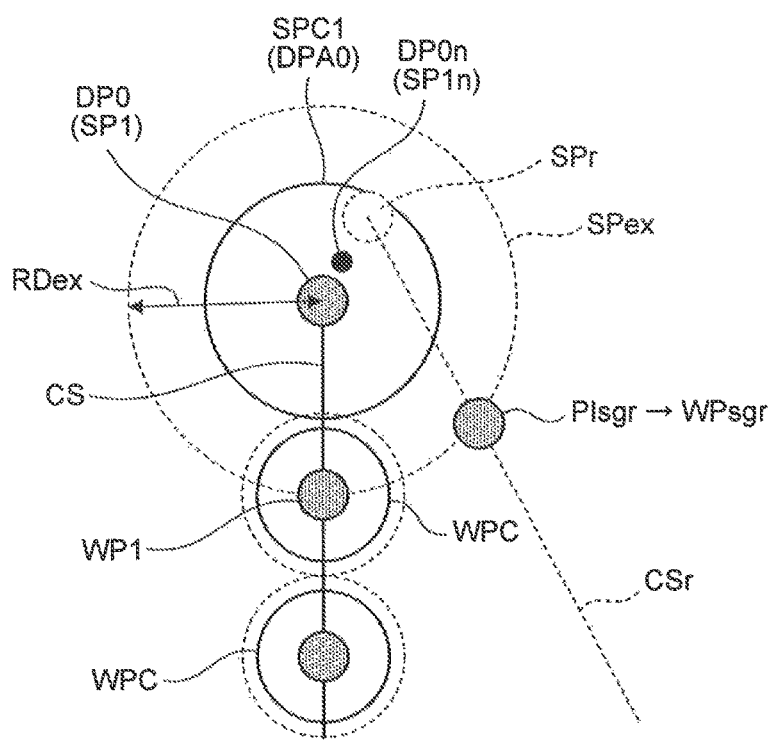
FIG. 13 is a diagram used to describe a case where the discharging position is not newly registered.

FIGS. 12 and 13 are diagrams provided to describe the case where the discharging position DP is not newly registered. The discharging position DP as the representative position of the discharge station DPA0 and the loading position LP are not newly registered when the determination is affirmative (Yes) in step S104. The discharging position DP0 (the travel starting position SP1) on the registered route CS is already described and registered in the LP/DP database 14RD and the registered route database 14CS of the management-side storage device 13 illustrated in FIG. 2.

FIGS. 12 and 13 illustrate the example where the travel starting position SPr on the actual travel route CSr is located within the range SPC1, namely the discharge station DPA0, with the predetermined radius RD centered around the discharging position DP0 (the representative position of the discharge station DPA0) that is already registered. It is thus determined that the travel starting position SPr on the actual travel route CSr corresponds with the registered discharging position DP0. Accordingly, the travel starting position SPr on the actual travel route CSr is not registered as a new discharging position DPn in the LP/DP database 14RD. Note that the travel starting position SPr on the actual travel route CSr corresponds to the position at which the truck is unloaded within the range SPC1 with the predetermined radius RD centered around the discharging position DP0 (the representative position of the discharge station DPA0).

In this case, the region specification unit 12c of the management-side processing device 12 illustrated in FIG. 2 uses the travel starting position SPr on the actual travel route CSr to correct the registered discharging position DP0. The region specification unit 12c determines a middle point of the two to be a corrected discharging position DP0n (a travel starting position SP1n), for example. The region specification unit 12c then rewrites the uncorrected discharging position DP0 described in the LP/DP database 14RD of the management-side storage device 13 into the corrected DP0n. The route-specific LP/DP database 14RD is updated as a result. Note that the discharge station DPA1 illustrated in FIG. 7 is processed in the same way as the discharge station DPA0.

The error in the discharging position DP0 can be made smaller as the number of travel starting positions SPr on the actual travel route CSr accumulates because the registered discharging position DP0 is corrected by using the travel starting position SPr on the actual travel route CSr. The discharge stations DPA0 and DPA1 also tend to widen gradually as the truck discharges the load. The corrected discharging position DP0n can therefore be reflected in specifying the route by correcting the discharging position DP0 with the use of the travel starting position SPr on the actual travel route CSr (the discharging position DPr on the actual travel route CSr for the discharge station DPA1 illustrated in FIG. 7). Now, there will be described a case where the loading position LP1 is not newly registered.

Figure 14:
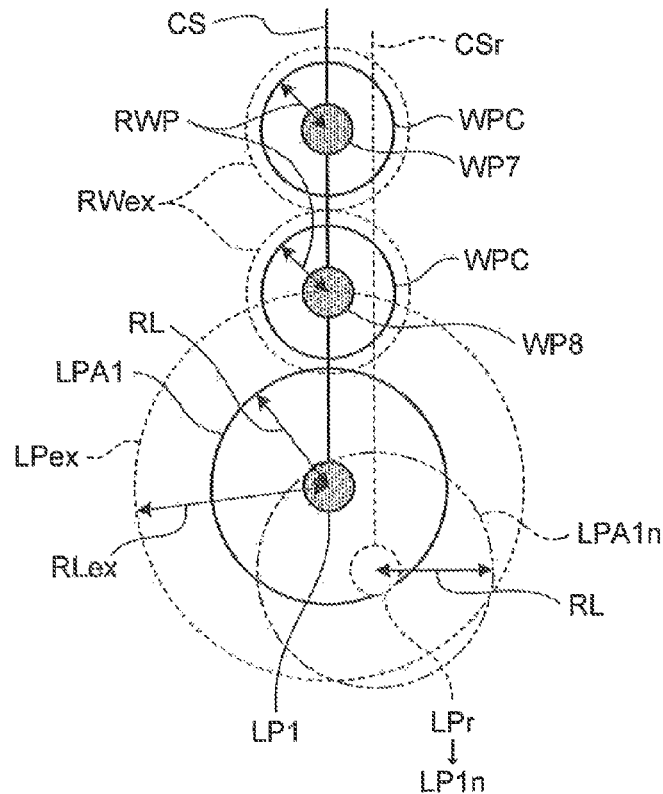
FIG. 14 is a diagram used to describe a case where a loading position is not newly registered.
Figure 15:
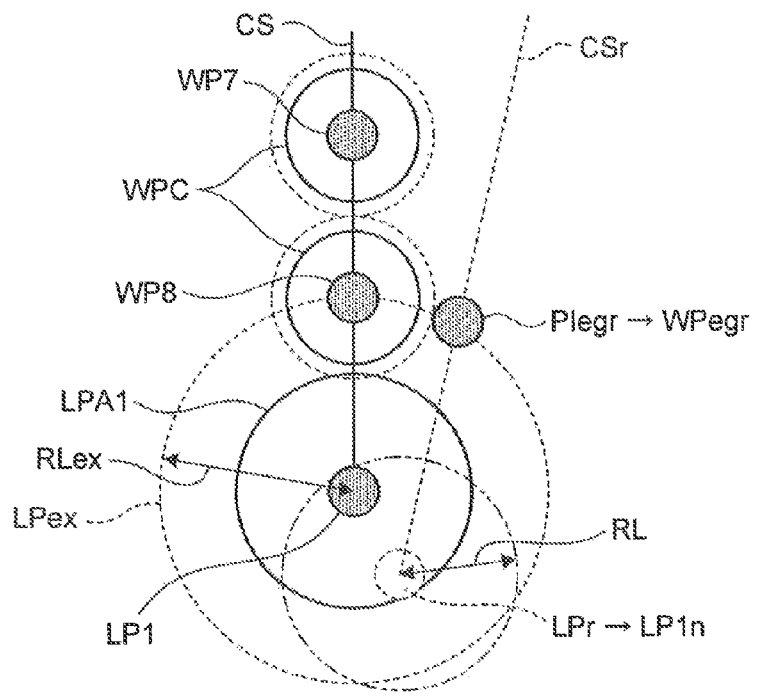
FIG. 15 is a diagram used to describe a case where the loading position is not newly registered.

FIGS. 14 and 15 are diagrams provided to describe the case where the loading position LP is not newly registered. The loading position LP1 on the registered route CS is already described and registered in the LP/DP database 14RD and the registered route database 14CS of the management-side storage device 13 illustrated in FIG. 2. FIGS. 14 and 15 illustrate the example where the loading position LPr on the actual travel route CSr is located within the range, namely the loading station LPA1, with the predetermined radius RL centered around the loading position LP1 that is already registered. It is thus determined that the loading position LPr on the actual travel route CSr corresponds with the registered loading position LP1. Accordingly, the loading position LPr on the actual travel route CSr is not registered as a new loading position LPn in the LP/DP database 14RD.

In this case, the region specification unit 12c uses the loading position LPr on the actual travel route CSr to correct the registered loading position LP1. The region specification unit 12c corrects the registered loading position LP1 by changing it to the loading position LPr on the actual travel route CSr, for example. A corrected loading position is indicated as LP1n for convenience in the present embodiment. A predetermined range around the corrected loading position LP1n is now a new loading station LPA1n. After the registered loading position LP1 is corrected, the correspondence between the loading position LPr on the actual travel route CSr and the registered loading position LP1n is determined according to whether or not the loading position LPr on the actual travel route CSr is located within the predetermined range around the corrected loading position LP1n. The loading station LPA1 in the present embodiment constantly shifts along a vein, whereby the corrected or current loading position LP1n can be reflected in specifying the route by correcting the loading position LP1 with the use of the loading position LPr on the actual travel route CSr.

It is preferred, in the case where the loading station LPA1 constantly shifts along the vein, that the loading position LP1 be at the same loading station within a range of a predetermined travel distance for a fixed period of time, without registering a new loading position. FIG. 14 illustrates the example where the corrected loading position LP1n is considered to be at the same loading station before and after correction within the range of the predetermined travel distance for the fixed period of time, so that the corrected loading position LP1n is not newly registered. When the loading position LP1 shifts for the predetermined travel distance or more from the position initially registered, for example, the overall travel distance of the travel route at that time becomes excessively longer than the travel distance initially registered, thereby making it difficult to regard the route as the same travel route. The loading position is considered to be at the same loading station before and after correction when the corrected loading position LP1n is within the range of the predetermined travel distance. Therefore, one can avoid the case where it is difficult to regard a route as the same travel route because of the increased overall travel distance, even when the loading position LP1 shifts along the vein. Moreover, the corrected loading position LP1n is considered to be at the same loading station before and after correction within the range of the predetermined travel distance for the fixed period of time in order to avoid determining the correspondence based on the loading position LP1n as old position information past the fixed period of time.

Figure 16:
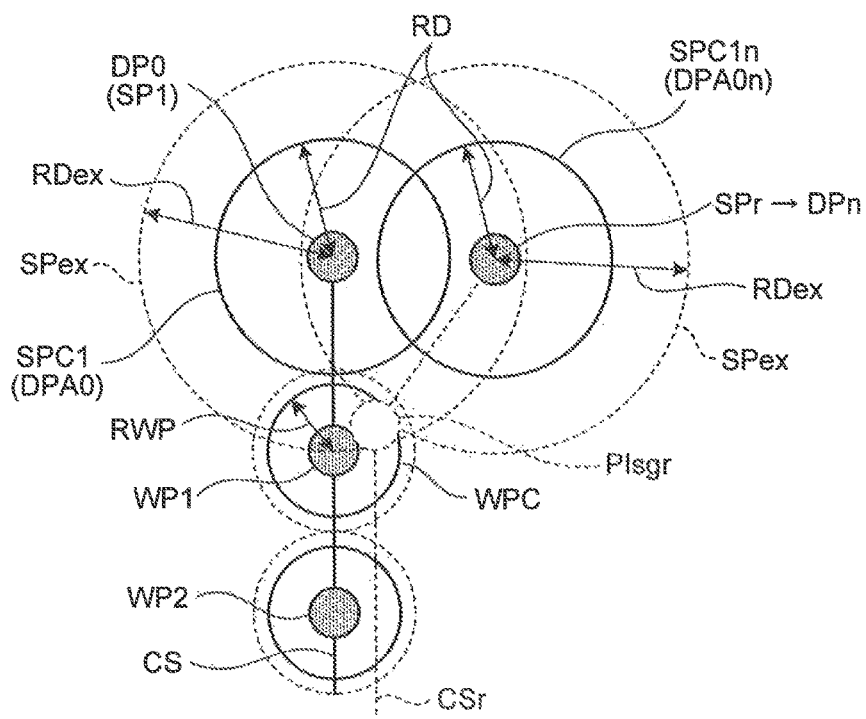
FIG. 16 is a diagram used to describe a case where the discharging position is newly registered.
Figure 17:
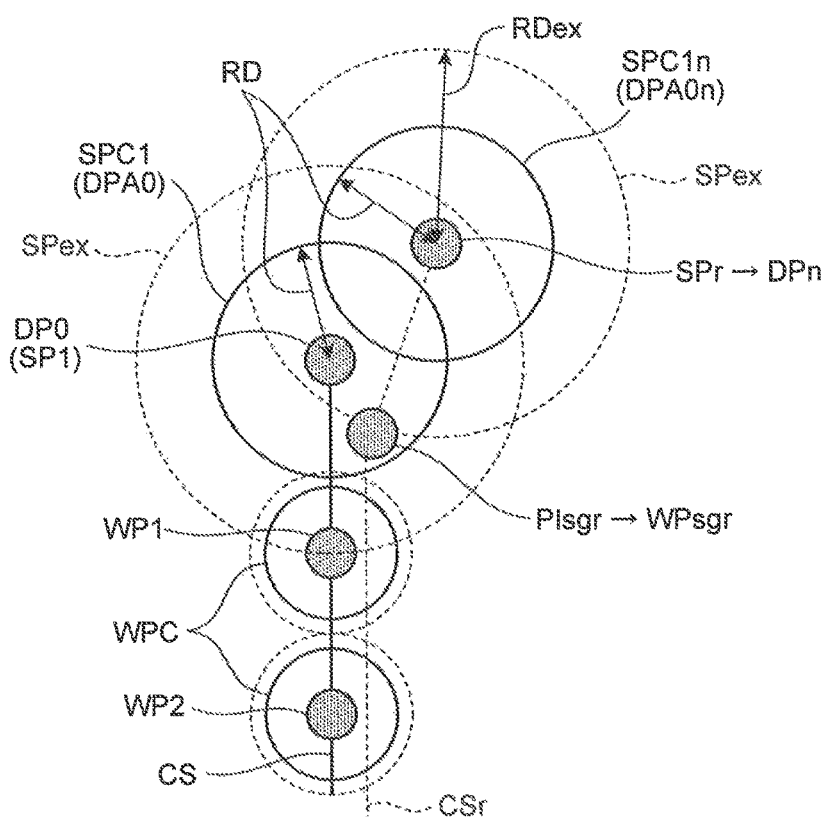
FIG. 17 is a diagram used to describe a case where the discharging position is newly registered.

FIGS. 16 and 17 are diagrams provided to describe a case where the discharging position DP is newly registered. These figures illustrate the example where the travel starting position SPr on the actual travel route CSr is located outside the range SPC1, namely the discharge station DPA0, with the predetermined radius RD centered around the discharging position DP0 (the travel starting position SP1) that is already registered. In this case, the route determination unit 12a determines that the travel starting position SPr on the actual travel route CSr does not correspond with the registered discharging position DP0. The region specification unit 12c then registers, into the LP/DP database 14RD, the position information and the like of the travel starting position SPr on the actual travel route CSr as a new discharging position DPn.

After newly registered, the new discharging position DPn is also used in the determination performed in step S103. In other words, the route determination unit 12a determines the correspondence between the travel starting position SPr and the discharging position DPn according to whether or not the travel starting position SPr on the actual travel route CSr is located within a predetermined range SPC1n (a discharge station DPA0n) with the predetermined radius RD centered around the discharging position DPn. Next, there will be described a case where the loading position LP is newly registered.

Figure 18:
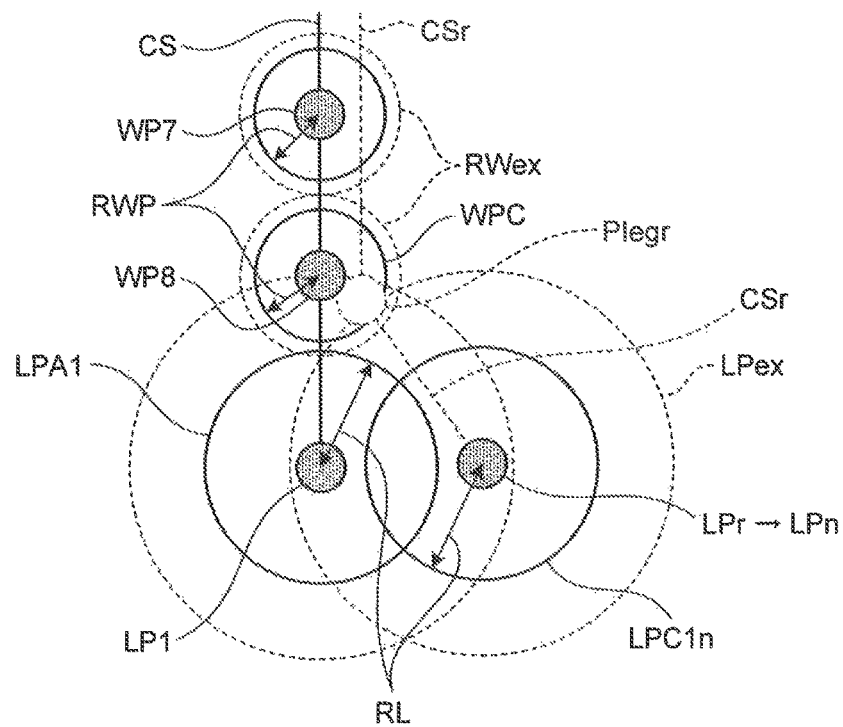
FIG. 18 is a diagram used to describe a case where the loading position is newly registered.
Figure 19:
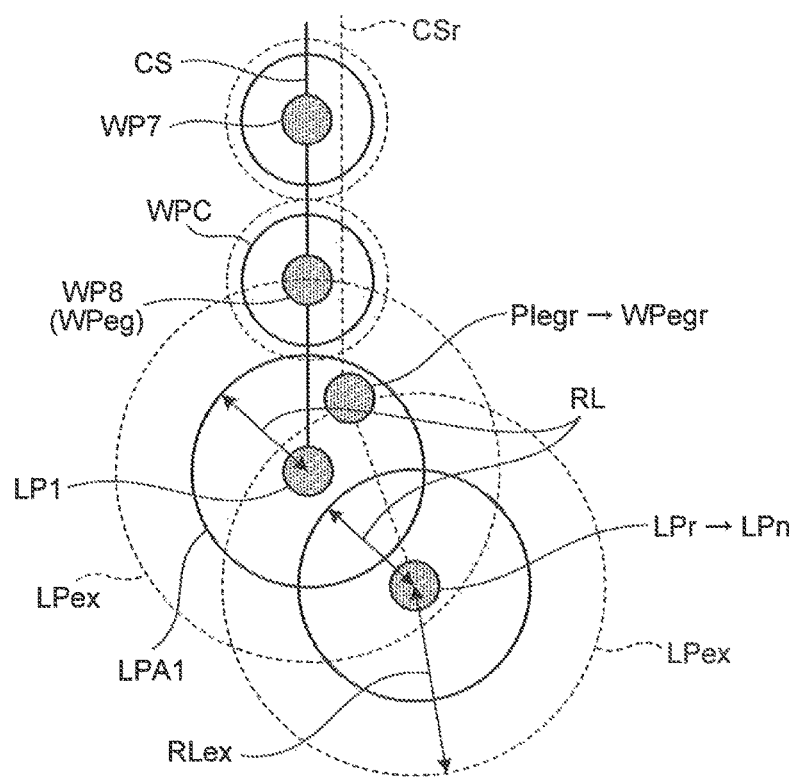
FIG. 19 is a diagram used to describe a case where the loading position is newly registered.

FIGS. 18 and 19 are diagrams provided to describe the case where the loading position LP is newly registered. These figures illustrate the example where the loading position LPr on the actual travel route CSr is located outside the range, namely the loading station LPA1, with the predetermined radius RL centered around the loading position LP1 that is already registered. In this case, the route determination unit 12a determines that the loading position LPr on the actual travel route CSr does not correspond with the registered loading position LP1. The region specification unit 12c then registers, into the LP/DP database 14RD, the position information and the like of the loading position LPr on the actual travel route CSr as a new loading position LPn.

After newly registered, the new loading position LPn is also used in the determination performed in step S103. In other words, the route determination unit 12a determines the correspondence between the loading position LPr and the loading position LPn according to whether or not the loading position LPr on the actual travel route CSr is located within a predetermined range LPC1n with the predetermined radius RL centered around the loading position LPn.

The number of loading positions LP corresponding to the second position on the registered route CS as well as the number of discharging positions DP corresponding to the first and third positions on the registered route CS increase every time the new loading position LPn or the new discharging position DPn is registered in the LP/DP database 14RD. The information of the loading position LP and the discharging position DP gets old as time elapses. Therefore, the route determination unit 12a in the present embodiment performs the determination in step S103 by using the loading position LP and the discharging position DP that are registered for a predetermined period of time or less in the LP/DP database 14RD. The route determination unit 12a can thus determine whether or not the discharging position DP and the like on the registered route CS corresponds with the discharging position DPr and the like on the actual travel route CSr in accordance with the condition of the mine that changes every moment, whereby the accuracy of determination is improved. The predetermined period of time is not particularly limited in the present embodiment but can be several days to several weeks, for example. The predetermined period of time may differ between the loading position LP and the discharging position DP. In this case, it is preferred that the predetermined period of time be shorter for the loading position LP than the discharging position DP. This is because the loading position LP tends to shift along the deposit or in accordance with the operation mode and thus changes more quickly than the discharging position DP.

Once at least one of the discharging position DP and the loading position LP is newly registered in step S114, the management-side processing device 12 proceeds the process to step S115. In step S115, the route determination unit 12a determines whether or not the position information PI on the actual travel route CSr corresponds with the passing position WP on the registered route CS, the passing position WP being already described and registered in the route-specific WP database 14WP of the management-side storage device 13. The determination is separately made for each of the outbound route CSr1 and the inbound route CSr2 of the actual travel route CSr. The determination is made for all the registered passing positions WP in the present embodiment but need not be made for all the passing positions WP.

The determination is already negative (No) in step S104 before step S115 is performed. Therefore, there is no registered route CS that corresponds with the actual travel route CSr. The route determination unit 12a can however extract a part of the actual travel route CSr partly corresponding with the registered route CS by extracting the passing position WP on the registered route CS that corresponds with the position information PT on the actual travel route CSr.

The route determination unit 12a determines whether or not the position information PI on the actual travel route CSr corresponds with the passing position WP on the registered route CS for all the registered passing positions WP in the present embodiment, but may only consider the passing position WP located within a predetermined range around the actual travel route CSr as a target for the determination. This allows the number of passing positions WP targeted for the determination to be decreased, thereby reducing the load required for the management-side processing device 12 in performing the determination process.

Figures 1, 20:
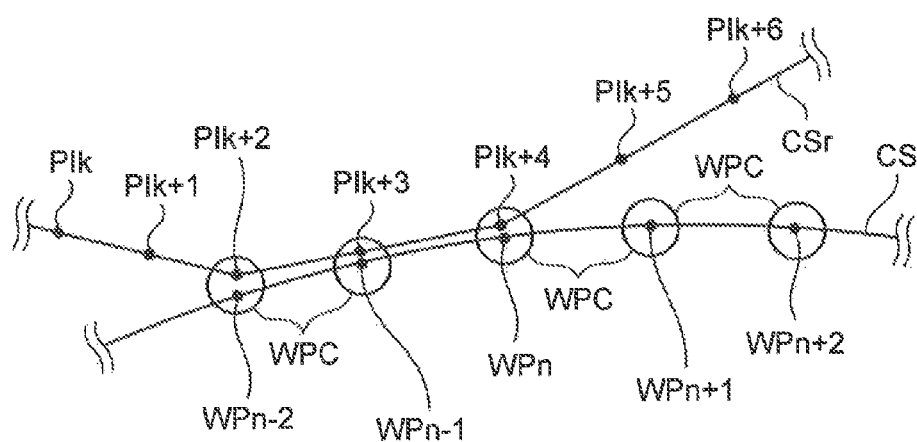
Figures 2, 20:
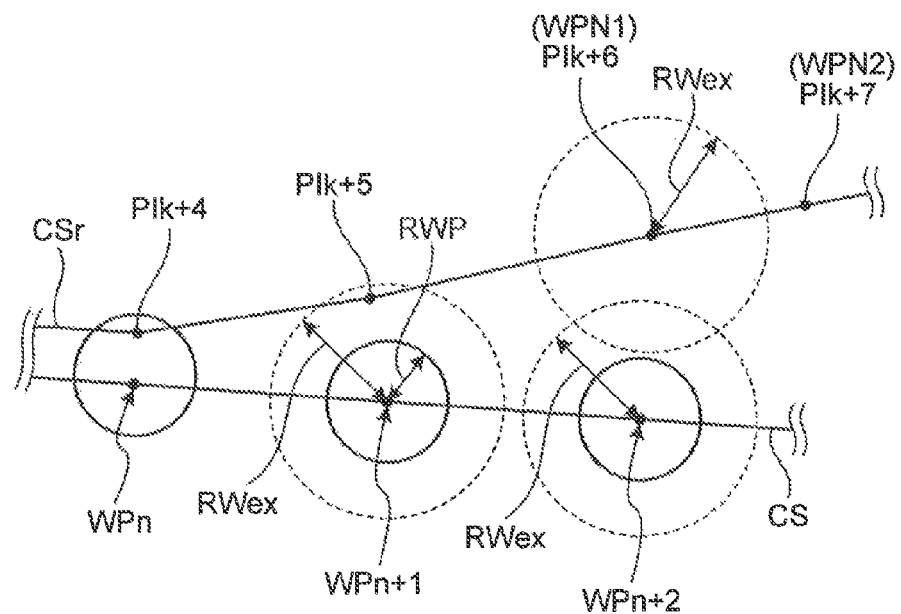

FIG. 20-1 is a diagram provided to describe a process of extracting the passing position WP on the registered route CS that corresponds with the position information PI on the actual travel route CSr. Reference numerals k, k+1, and the like (where "k" is an integer) attached to the reference numeral PI indicating the position information in FIG. 20-1 are provided to distinguish the plurality of pieces of position information PI. It is simply referred to as the position information PI when there is no need to distinguish the plurality of pieces of position information PT. Moreover, reference numerals n, n+1, and the like (where "n" is an integer) attached to the reference numeral WP indicating the passing position in FIG. 20-1 are provided to distinguish the plurality of passing positions WP. It is simply referred to as the passing position WP when there is no need to distinguish the plurality of passing positions WP. FIG. 20-1 illustrates the example where a part of the actual travel route CSr corresponds with a part of a plurality of passing positions WPn−2 to WPn+2 included in the registered route CS. Specifically, position information PIk+2, PIk+3, and PIk+4 among a plurality of pieces of position information PIk to PIk+6 (where "k" is an integer) included in the actual travel route CSr are located within a predetermined range WPC with a predetermined radius around the passing positions WPn−2, WPn−1, and WPn, respectively.

The route determination unit 12a illustrated in FIG. 2 extracts the passing positions WPn−2, WPn−1, and WPn on the registered route CS that correspond with the position information PIk+2, PIk+3, and PIk+4 included as a part of the actual travel route CSr. Next, the route determination unit 12a uses the position information PIk+2, PIk+3, and PIk+4 on the actual travel route CSr to correct the corresponding passing positions WPn−2, WPn−1, and WPn. This correction is performed as described above. Once the correction is completed, the route determination unit 12a rewrites the uncorrected value described in the route-specific WP database 14WP of the management-side storage device 13 into a corrected value. The route determination unit 12a determines whether or not the position information PT on the actual travel route CSr corresponds with the passing position WP for all the targeted passing positions WP, corrects any corresponding passing position WP with the position information PI, and proceeds to step S116. In step S116, the route information generation unit 12d of the management-side processing device 12 illustrated in FIG. 2 generates a new passing position WP in a part not corresponding with the passing position WP on the registered route CS.

FIG. 20-2 is a diagram provided to describe a method of generating a new passing position WP. In the present embodiment, the route information generation unit 12d cannot generate the new passing position WP within a range WPex enclosed with a passing position exclusion radius RWex of a predetermined size around the existing passing position WP. In other words, the route information generation unit 12d generates the new passing position WP outside the range WPex enclosed with the passing position exclusion radius RWex of the predetermined size around the existing passing position WP. The passing position exclusion radius RWex is greater than the predetermined radius RWP that is used in determining whether or not the position information PI on the actual travel route CSr corresponds with the passing position WP. In the present embodiment, the passing position exclusion radius RWex is approximately 50 m but is not limited thereto.

FIG. 20-2 illustrates the example where the position information PIk+5 on the actual travel route CSr is located within the passing position exclusion radius RWex of the passing position WPn+1 on the registered route CS. The route information generation unit 12d therefore does not generate a passing position WP at the position of the position information PIk+5. On the other hand, the position information PIk+6 on the actual travel route CSr is located in a region excluding the range with the passing position exclusion radius RWex (a passing position exclusion region) of each of the passing position WPn+1 and the passing position WPn+2 on the registered route CS, or located outside the range. The route information generation unit 12d therefore generates a new passing position WPN1 at the position of the position information PIk+6.

The route information generation unit 12d generates a next new passing position WPN2 adjacent to the new passing position WPN1 in a region excluding the range with the passing position exclusion radius REex of the passing position WPn+2 on the registered route CS by using the position information PIk+7 of a position that is a predetermined distance away from the passing position WPN1. Accordingly, the route information generation unit 12d generates the new passing positions WPN1, WPN2, and the like from the position information PI included in the actual travel route CSr and registers them into the route-specific WP database 14WP of the management-side storage device 13.

FIGS. 12 to 19 will now be used to describe an example of generating or not generating a new passing position WP in the vicinity of the discharging position DP and the loading position LP. FIG. 12 illustrates the example where the actual travel route CSr is located within the predetermined range WPC with the predetermined radius RWP centered around each of the passing positions WP1 and WP2 on the registered route CS, whereby the passing position WP is not newly generated. Likewise, FIG. 14 illustrates the example where the actual travel route CSr is located within the predetermined range WPC with the predetermined radius RWP centered around each of the passing positions WP7 and WP8 on the registered route CS, whereby the passing position WP is not newly generated.

FIG. 16 illustrates the example where position information PIsgr on the actual travel route CSr is located within the predetermined range WPC with the predetermined radius RWP centered around the passing position WP1 on the registered route CS. Therefore, a new passing position WP is not generated from the position information PIsgr on the actual travel route CSr. The passing position WP1 on the registered route CS is corrected by using the position information PIsgr on the actual travel route CSr, in this case. FIG. 18 illustrates the example where position information PIegr on the actual travel route CSr is located within the predetermined range WPC with the predetermined radius RWP centered around the passing position WP8 on the registered route CS. Therefore, a new passing position WP is not generated from the position information PIegr on the actual travel route CSr. The passing position WP8 on the registered route CS is corrected by using the position information PIegr on the actual travel route CSr, in this case.

As illustrated in FIGS. 12 to 19, the passing positions WP1, WP2, and the like on the registered route CS are all generated outside the passing position exclusion radius RWex. As illustrated in FIGS. 12, 13, 16, and 17, the route information generation unit 12d does not generate a passing position WP inside a range (a second range on the discharging side; hereinafter referred to as a passing position exclusion region, as appropriate) SPex with a passing position exclusion radius RDex of a predetermined size centered around the discharging position DP0 (the travel starting position SP1). That is, the route information generation unit 12d generates the passing position WP in a region excluding the passing position exclusion region SPex. Furthermore, as illustrated in FIGS. 14, 15, 18, and 19, the route information generation unit 12d does not generate the passing position WP inside a range (a second range or a second range on the loading side; hereinafter referred to as a passing position exclusion region, as appropriate) LPex with a passing position exclusion radius RLex of a predetermined size centered around the loading position LP1. The passing position exclusion radius RDex is greater than the predetermined radius RD of the discharge station DPA0, while the passing position exclusion radius RLex is greater than the predetermined radius RL of the loading station LPA1.

There is usually no set track in the vicinity of the loading station LPA and the discharge station DPA. The area in the vicinity of the loading station LPA and the discharge station DPA is thus excluded when determining the correspondence between the actual travel route CSr and the passing position WP on the registered route CS. For this reason, the passing position exclusion region LPex and the passing position exclusion region SPex are provided in the loading station LPA and the discharge station DPA in the present embodiment, respectively.

FIG. 13 illustrates the example where the position information PIsgr on the actual travel route CSr is not located within the predetermined range WPC with the predetermined radius RWP centered around the passing position WP1 on the registered route CS. A new passing position WPsgr is therefore generated from the position information PIsgr on the actual travel route CSr. In this case, the new passing position WPsgr is generated in a region excluding the passing position exclusion region SPex with the passing position exclusion radius RDex centered around the discharging position DP0 (the travel starting position SP1). Likewise, FIG. 17 illustrates the example where the position information PIsgr on the actual travel route CSr is not located within the predetermined range WPC with the predetermined radius RWP centered around the passing position WP1 on the registered route CS. Moreover, the travel starting position SPr on the actual travel route CSr is registered as the new discharging position DPn in the example illustrated in FIG. 17. In this case, a new passing position WPsgr is generated in a region excluding the passing position exclusion region SPex with the passing position exclusion radius RDex centered around the new discharging position DPn. The new passing position WPsgr may be located within the range SPC1, namely the discharge station DPA0, with the predetermined radius RD centered around the discharging position DP0 on the registered route CS.

FIG. 15 illustrates the example where the position information PIegr on the actual travel route CSr is not located within the predetermined range WPC with the predetermined radius RWP centered around the passing position WP8 on the registered route CS. A new passing position WPegr is therefore generated from the position information PIegr on the actual travel route CSr. In this case, the new passing position WPegr is generated in a region excluding the passing position exclusion region LPex with the passing position exclusion radius RLex centered around the loading position LP1. FIG. 19 also illustrates the example where the position information PIegr on the actual travel route CSr is not located within the predetermined range WPC with the predetermined radius RWP centered around the passing position WP8 on the registered route CS. Moreover, the loading position LPr on the actual travel route CSr is registered as the new loading position LPn in the example illustrated in FIG. 19. In this case, the new passing position WPegr is generated in a region excluding the passing position exclusion region LPex with the passing position exclusion radius RLex centered around the new loading position LPn. The new passing position WPegr may be located within the range, namely the loading station LPA1, with the predetermined radius RL centered around the loading position LP1 on the registered route CS.

Once the new passing position WP is generated at the part of the actual travel route CSr not corresponding with the passing position WP on the registered route CS, a new pieces of new route information generated by using the position information PI corresponding to the actual travel route CSr is registered as a new route into the registered route database 14CS of the management-side storage device 13 in step S117. The route information generation unit 12d in this case uses the passing position WP that is newly generated and registered in step S116 as a node, connects the node by a link, and generates the route information corresponding to the actual travel route CSr. The route information generation unit 12d then describes the generated route information corresponding to the actual travel route CSr into the registered route database 14CS and stores it in the management-side storage device 13. There may be at least two or more passing positions WP included in the route information corresponding to the actual travel route CSr, so that there may be at least one link.

The route information generation unit 12d generates the route information corresponding to the actual travel route CSr by using the passing position WP, if any, that is already registered and existent and corresponds with the position information PI on the actual travel route CSr. When the route information corresponding to the actual travel route CSr corresponds with a part of the existing route information, the record such as the number of travels of the dump truck 20 of the corresponding part can be added together at the time of aggregation. As a result, the operating condition of the dump truck 20 can be analyzed in more detail and more accurately.

After registering the new piece of route information (hereinafter referred to as new route information, as appropriate) corresponding to the actual travel route CSr, the route analysis unit 12e of the management-side processing device 12 illustrated in FIG. 2 counts, in step S118, at least one of the number of travels, the travel time, and the operation information for each link in the new route information generated in step S117. The registered new route information now becomes the registered route. In step S119, the route analysis unit 12e extracts from the route-specific specific section database 14SC the registered specific section SC that corresponds with a section at a part of the new route information generated in step S117. The specific section SC corresponds with a section having two passing positions WP at both ends of the section in the new route information, for example, when the specific section positions SPt1 and SPt2 at both ends of the registered specific section SC correspond with the two passing positions WP included in the new route information, respectively.

The registered specific section SC corresponding with the section at a part of the new route information is used as a specific section of the new route information. Accordingly, the record such as the number of travels of the dump truck 20 in any specific section identical to the specific section SC that is already registered and existent can be added together at the time of aggregation. As a result, the operating condition of the dump truck 20 can be analyzed in more detail and more accurately. The management-side processing device 12 proceeds to step S120 after extracting the registered specific section SC corresponding with the section at a part of the new route information. In step S120, the route analysis unit 12e newly generates a specific section for a part of the new route information that does not correspond with the registered specific section SC.

Figure 21:
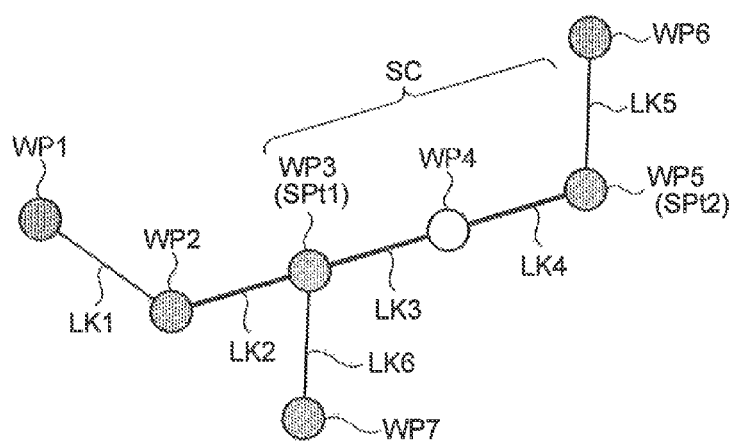
FIG. 21 is a diagram illustrating an example of a combination of a passing position WP and a link including a section in a part of new route information RIN.
Figure 22:
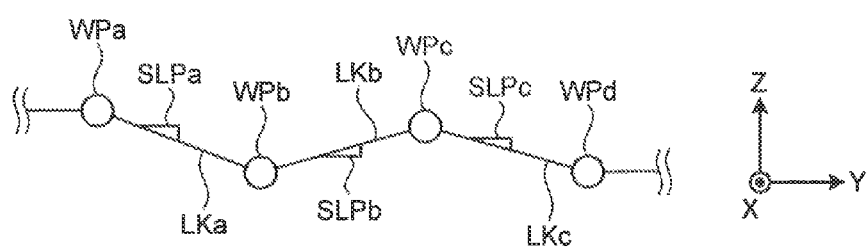
FIG. 22 is a diagram used to describe an example of a method of generating a section.
Figures 23, 24:
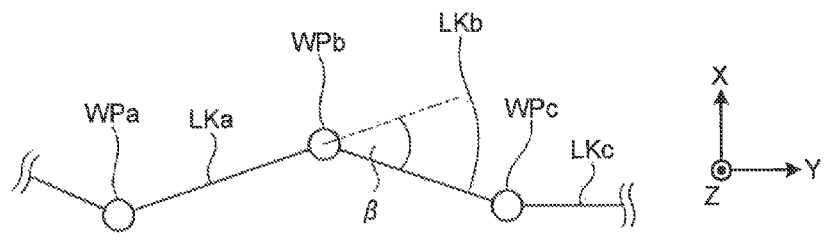
FIG. 23 is a diagram illustrating classification by a slope angle used in generating the section.
FIG. 24 is a diagram used to describe an example of a method of generating the section.

FIG. 21 is a diagram illustrating an example of a combination of the passing position WP and the link LK including a specific section SC in a part of new route information RIN. FIG. 22 is a diagram provided to describe an example of a method of generating a specific section SC. FIG. 23 is a diagram illustrating classification by a slope angle used in generating the specific section SC. FIG. 24 is a diagram provided to describe an example of a method of generating the specific section SC. A Z-axis in FIGS. 22 and 24 indicates a vertical direction. An X-axis and a Y-axis are orthogonal to each other and to the Z-axis. In generating the specific section SC from the new route information RIN, the route analysis unit 12e determines, as the specific section SC, a part of the new route information RIN where the difference in slopes of the links LK adjacent to each other is within a predetermined range, the bearing difference between the links LK adjacent to each other is within a predetermined value, and no intersection is included between the links.

The new route information RIN illustrated in FIG. 21 includes the plurality of passing positions WP1 and WP2 to WP7 and the plurality of links LK1 and LK2 to LK6. The passing positions WP3, WP4, and WP5 and the links LK3 and LK4 correspond to the specific section SC. The passing positions WP3 and WP5 correspond to the specific section positions SPt1 and SPt2, respectively. As illustrated in FIG. 22, links LKa, LKb, and LKc have slopes SLPa, SLPb, and SLPc (%), respectively. It is simply referred to as a slope SPL when there is no need to distinguish the slopes SLPa, SLPb, and SLPc. The slope is determined to be identical when the difference in the slopes SPL (%) of the links adjacent to each other falls within a predetermined range. The slope is determined to be identical in the present embodiment when the slope SLP of each of the links LKa, LKb, and LKc classified into five levels falls under the same level, for example. As illustrated in FIG. 23, level 1 has the slope SLP less than −a (%), level 2 has the slope SLP that is −a (%) or greater and less than b (%), level 3 has the slope SLP that is b (%) or greater and c (%) or less, level 4 has the slope SLP greater than c (%) and d (%) or less, and level 5 has the slope SLP greater than d (%). The magnitude of a, b, c, and d is not particularly limited. The slope analysis unit 12b of the management-side processing device 12 illustrated in FIG. 2 determines the identity of the slope. The route analysis unit 12e generates the specific section SC based on the determination result by the slope analysis unit 12b.

As illustrated in FIG. 24, the adjacent links LKa and LKb are determined to be in the same direction when the bearing difference β(degrees) between the adjacent link LKa and link LKb is within a predetermined angle γ. In the present embodiment, the predetermined angle γ is 30 degrees but is not limited thereto. The bearing of each of the link LKa and the link LKb is found from the coordinate of the pair of passing positions WPa and WPb and passing positions WPb and WPc that are located at both ends of the link LKa and the link LKb, respectively.

In the present embodiment, the route analysis unit 12e generates the new route information RIN as the new piece of route information by extracting the intersection based on the number of links LK1 and LK2 to LK6 connected to the passing positions WP1 and WP2 to WP7 as nodes. Specifically, the route analysis unit 12e extracts, as the intersection, a single passing position to which three or more links are connected. FIG. 21 illustrates the example where three links LK2, LK3, and LK6 are connected to the passing position WP3. The route analysis unit 12e thus extracts the passing position WP3 as the intersection. While the links LK2, LK3, and LK4 have the bearing difference within the predetermined value and the same slope in the example illustrated in FIG. 21, the specific section SC includes the passing positions WP3, WP4, and WP5 and the links LK3 and LK4 since the passing position WP3 is the intersection. The specific section SC is newly generated by such method in the new route information RIN in step S120.

Thereafter, the route analysis unit 12e in step S113 aggregates the generated specific section SC. At least one of the number of travels, the travel time, and the operation information of the dump truck 20 is aggregated for each specific section SC, for example.

Figure 25:
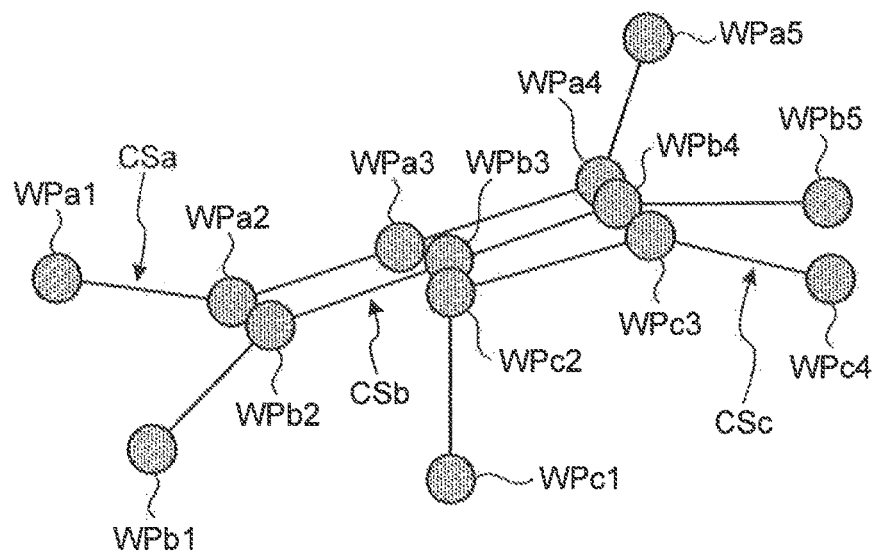
FIG. 25 is a diagram illustrating a state where identical passing positions WP in a plurality of pieces of route information are not integrated.

FIG. 25 is a diagram illustrating a state where identical passing positions WP in a plurality of pieces of route information CSa, CSb, and CSc are not integrated. FIG. 25 illustrates the example where the route information CSa includes passing positions WPa1, WPa2, WPa3, WPa4, and WPa5, the route information CSb includes passing positions WPb1, WPb2, WPb3, WPb4, and WPb5, and the route information CSc includes passing positions WPc1, WPc2, WPc3, and WPc4. The passing positions WPa2 and WPb2 are the identical positions, the passing positions WPa3, WPb3, and WPc2 are the identical positions, and the passing positions WPa4, WPb4, and WPc3 are the identical positions.

When the identical passing positions WP are not integrated, the identical section is determined as a different route in each of the route information CSa, CSb, and CSc, whereby the operation information of the dump truck 20 is aggregated for each of the route information CSa, CSb, and CSc, for example. Therefore, the operation information in the identical section cannot be added together at the time of the aggregation. Moreover, it is required to extract the operation information in the identical section from each of the route information CSa, CSb, and CSc when the state of the dump truck 20 travelling the identical section is to be compared, thereby possibly requiring time in the process.

Figure 26:
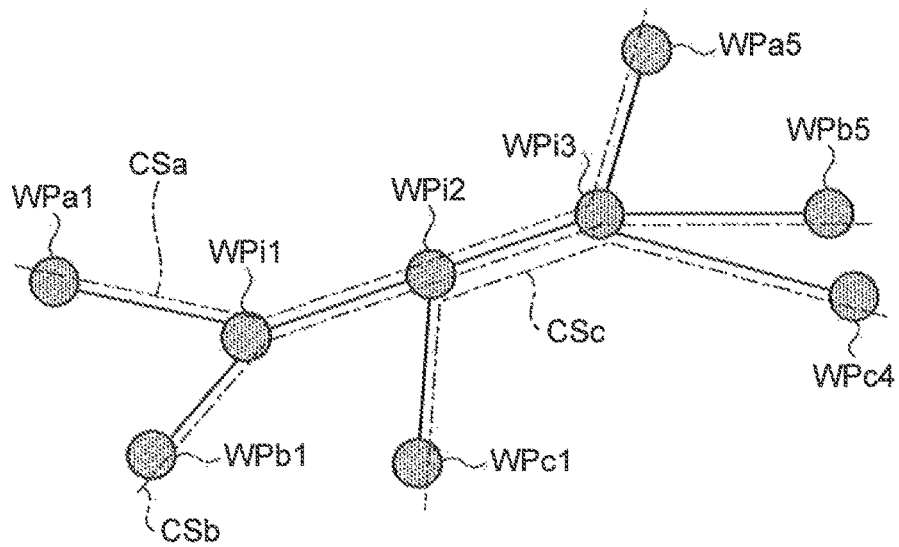
FIG. 26 is a diagram illustrating a state where the identical passing positions WP in the plurality of pieces of route information are integrated.

FIG. 26 is a diagram illustrating a state where the identical passing positions WP in the plurality of pieces of route information CSa, CSb, and CSc are integrated. In the present embodiment, the passing positions WPa2 and WPb2, the passing positions WPa3, WPb3, and WPc2, and the passing positions WPa4, WPb4, and WPc3 that are identical among the plurality of pieces of route information CSa, CSb, and CSc as described above are integrated into a passing position WPi1, a passing position WPi2, and a passing position WPi3, respectively. The operation information in the identical section can thus be added together at the time of aggregation in the present embodiment. As a result, the operating condition of the dump truck 20 can be analyzed in more detail and more accurately. Moreover, the comparison of the state of the dump truck 20 travelling the identical section in the present embodiment can be made easily since one need only extract the operation information in the identical section being integrated.

Figure 27:
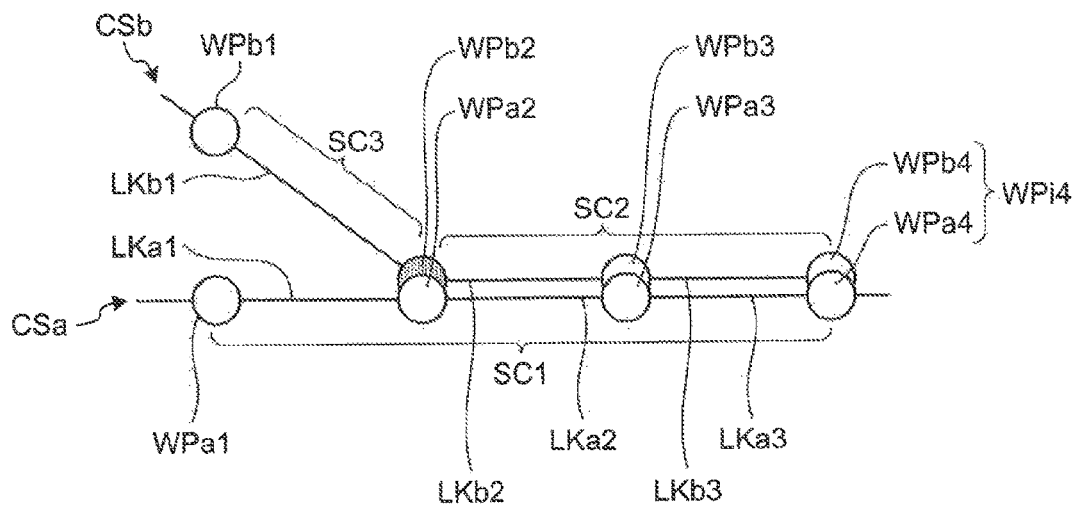
FIG. 27 is a diagram used to describe aggregation of the specific section.
Figure 28:
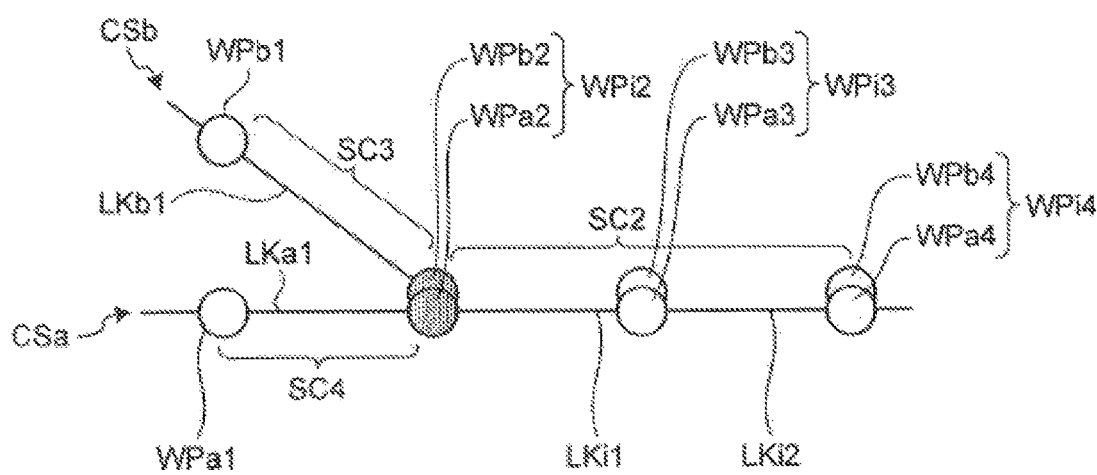
FIG. 28 is a diagram used to describe aggregation of the specific section.

FIGS. 27 and 28 are diagrams provided to describe aggregation of the specific section SC. It is possible that the number of links LK connected to the passing position WP increases as the number of registered routes increases. The number of intersections increases as a result. Therefore, the route analysis unit 12e in the present embodiment re-calculates the specific section SC periodically such as approximately once a week or once a month.

Generated in the route information CSa as the registered route in the example illustrated in FIG. 27 is a specific section SC1 which includes the passing positions WPa1, WPa2, WPa3, and WPa4 and links LKa1, LKa2, and LKa3. The route information CSb as the registered route includes the passing positions WPb1, WPb2, WPb3, and WPb4 and links LKb1, LKb2, and LKb3. A specific section SC2 and a specific section SC3 are generated, with the passing position WPb2 as a boundary therebetween, in the route information CSb since the bearing difference between the link LKb1 and the link LKb2 exceeds the predetermined value.

FIG. 27 illustrates the example where the passing position WPa2 of the route information CSa is identical to the passing position WPb2 of the route information CSb. Three links LKa1, LKa2, and LKb1 are connected to these two positions, which make them the intersection. Accordingly, the route analysis unit 12e re-calculates the specific section SC to integrate each of the identical passing positions WPa2 and WPb2, passing positions WPa3 and WPb3, and passing positions WPa4 and WPb4 in the route information CSa and CSb into passing positions WPi2, WPi3, and WPi4 as illustrated in FIG. 28, respectively. The route analysis unit 12e determines the passing position WPi2, to which three links LKa1, LKa2, and LKb1 are connected, as the intersection and divides the specific section SC along the intersection.

Regenerated from the route information CSa and CSb as a result are a specific section SC2 including the passing positions WPi2, WPi3, and WPi4 and links LKi1 and LKi2, a specific section SC3 including the passing positions WPb1 and WPi2 and the link LKb1, and a specific section SC4 including the passing positions WPa1 and WPi2 and the link LKa1. Accordingly, the specific section SC based on the actual travel route can be obtained in the present embodiment because the route analysis unit 12e periodically regenerates the specific section SC.

(First Variation)

A procedure of a mining machine management method according to first variation of the present embodiment will be described. The mining machine management method according to first variation is implemented by a management system 1 illustrated in FIG. 1 such as a management device 10 illustrated in FIG. 2. The mining machine management method according to first variation includes extracting a route candidate, determining correspondence of a passing position WP for each route candidate, and determining a travel distance. Specifically, according to a flowchart illustrated in FIG. 6, a management-side processing device 12 executes step S105 and step S106, followed by step S109 and step S110 when the determination in step S106 is affirmative (Yes). The management-side processing device 12 then executes step S107 and step S108 when the determination in step S110 is affirmative (Yes), and executes step S111 when the determination in step S108 is affirmative (Yes).

In calculating the travel distance on an outbound route CSr1 of an actual travel route CSr in step S107 in the present variation, a route determination unit 12a excludes the distance equivalent to a predetermined radius RD from a travel starting position SPr and the distance equivalent to a predetermined radius RL from a loading position LPr. The route determination unit 12a further excludes the distance equivalent to the predetermined radius RD from a discharging position DPr and the distance equivalent to the predetermined radius RL from the loading position LPr in calculating the travel distance on an inbound route CSr2 of the actual travel route CSr.

(Second Variation)

A procedure of a mining machine management method according to second variation of the present embodiment will be described. The mining machine management method according to second variation is implemented by a management system 1 illustrated in FIG. 1 such as a management device 10 illustrated in FIG. 2. The mining machine management method according to second variation includes determining correspondence of an existing passing position WP at first, followed by determining correspondence of a loading position LP and a discharging position DP and searching for a route candidate. The method thereafter determines correspondence of a passing position WP in the course candidate for each route.

Specifically, according to a flowchart illustrated in FIG. 6, a management-side processing device 12 executes step S102 and then step S115. At this time, a route determination unit 12a temporarily stores an existing passing position WP extracted by the process performed in step S115 and corresponding with an actual travel route CSr into a workspace of a management-side storage device 13 illustrated in FIG. 2.

Subsequently, the management-side processing device 12 executes step S103, step S104, step S105, and step S106 in this order. The management-side processing device 12 then executes step S109 and step S110 when the determination in step S106 is affirmative (Yes), and executes step S107 and step S108 when the determination in step S110 is affirmative (Yes). Note that the management-side processing device 12 may instead execute step S106 followed by step S107 and step S108 when the determination in step S106 is affirmative (Yes), and then execute step S109 and step S110 when the determination in step S108 is affirmative (Yes). The passing position WP is not corrected in step S109 according to the present variation. In step S109, the route determination unit 12a determines correspondence between the existing passing position WP which is extracted in step S115, stored in the workspace, and corresponds with the actual travel route CSr and a passing position WP on a registered route CS to be a candidate.

In the present variation, it is first determined whether or not position information PI on the actual travel route CSr corresponds with the passing position WP on the registered route CS, or the existing passing position WP (S115), followed by the determination of correspondence between the corresponding position information PI on the actual travel route CSr and the passing position WP on the registered route CS to be the candidate (S109).

The position information corresponding with the existing passing position WP is extracted from among a number of pieces of position information PI on the actual travel route CSr by executing step S115 before step S109, as described above. In step S109, the route determination unit 12a need only determine the correspondence between the existing passing position WP corresponding with the actual travel route CSr and the passing position WP on the registered route CS. The present variation can thus reduce the processing time and the load on hardware when there are a number of course candidates because the correspondence with the course candidate is performed after determining the correspondence of the existing passing position WP.

As described above, it is determined in the present embodiment whether or not the actual travel route CSr is identical to the registered route CS by using at least the plurality of passing positions WP included in the route information of the registered route CS and the plurality of pieces of position information PI included in the actual travel route CSr. Here, it is determined in the present embodiment that the actual travel route CSr is identical to the registered route CS when: the travel starting positions, the loading positions, and the discharging positions correspond between the two routes; the predetermined ratio or more of the passing positions WP corresponds with the position information on the actual travel route CSr; and the difference between the travel distance on the registered route CS and the travel distance on the actual travel route CSr is within the predetermined range. As a result, the accuracy of distinguishing and specifying the route traveled by the dump truck 20 can be improved. The condition of correspondence in the present embodiment is that the predetermined ratio or more of the passing positions WP corresponds with the position information on the actual travel route CSr and that the difference between the travel distance on the registered route CS and the travel distance on the actual travel route CSr is within the predetermined range, which allows one to distinguish the actual travel route CSr different from the registered route CS because the dump truck stops for refueling or goes out of the way, for example. By comparing the route information on the registered route CS located in the predetermined range around the actual travel route CSr including the plurality of pieces of position information PI, there is no need to make comparison with the route information on all registered routes CS located throughout the vast mine in the present embodiment. This is preferable because the load on the hardware can be reduced.

Moreover, the present embodiment determines that the passing position WP corresponds with the position information PI when the position information PI is located in the predetermined range around the passing position WP, and also corrects the passing position WP by using the position information PI located within the predetermined range around the passing position WP. This allows the error in the passing position WP to be made smaller in the present embodiment as the number of travels of the dump truck 20 passing the identical passing position WP increases. As a result, the accuracy of distinguishing and specifying the route traveled by the dump truck 20 can be improved according to the present embodiment.

Furthermore, the present embodiment corrects the loading position on the registered route based on the position at which the dump truck 20 is loaded at the loading station, namely, the position information of the latest loading position. This allows the loading position after it is shifted to be registered when the loading position is shifted within the predetermined range. The accuracy of distinguishing and specifying the route traveled by the dump truck 20 can be improved as a result.

Furthermore, the present embodiment corrects the representative position based on the representative position of the discharge station DPA, namely, the position information of the discharging position DP1 or the like at which the dump truck 20 is unloaded within the predetermined range around the discharging position on the registered route. This allows the error in the representative position of the discharge station DPA to be made smaller as the number of times the dump truck 20 is unloaded increases. As a result, the accuracy of distinguishing and specifying the route traveled by the dump truck 20 can be improved according to the present embodiment.

Moreover, the present embodiment determines, as the specific section SC, the part of the route information where the slope difference between the adjacent links is within the predetermined value, the bearing difference between the adjacent links is within the predetermined value, and the links do not have the intersection therebetween, the route information including the node and the link on the registered route CS. The accuracy of generating the specific section SC is thus improved in the present embodiment since the specific section SC is generated by using not only the slope difference and the bearing difference between the links adjacent to each other but also the presence of the intersection. The accuracy of analyzing the operating condition or the like of the dump truck 20 passing the specific section SC can be improved in the present embodiment by extracting the specific section SC generated in the aforementioned manner from the plurality of registered routes CS.

The present embodiment has been described above but is not limited to what has been described. While each of the range SPC1 used to determine the correspondence between the position information and the travel starting position SP1, the range (the loading station LPA1) used to determine the correspondence between the position information and the loading position LP1, the range (the discharge station DPA1) used to determine the correspondence between the position information and the discharging position DP1, and the range WPC used to determine the correspondence between the position information and the passing position WP is in the shape of a circle having the predetermined radius, the present embodiment is not limited to such shape, for example. Each shape may be something other than a circle such as an ellipse, a rectangle, a polygon or a free form having a region of a predetermined size, for example. Moreover, the passing position exclusion region provided in each of the vicinity of the discharging positions DP0 and DP1, the vicinity of the loading position LP1, and the vicinity of the passing position WP in order to not generate the new passing position WP is in the shape of a circle having the predetermined radius. The present embodiment is not however limited to such shape. Each shape may be something other than a circle such as an ellipse, a rectangle, a polygon or a free form having a region of a predetermined size, for example. Furthermore, the procedure that implements the mining machine management method according to the present embodiment is not limited to the procedure described in the flowchart of the present embodiment and may be modified as long as the same effect can be obtained.

The aforementioned components include the one that can be easily envisioned by those skilled in the art, is substantially the same, and has what is called the equal range. The aforementioned components can also be combined as appropriate. Moreover, the components can be omitted, substituted or modified in various ways without departing from the scope of the present embodiment. While the mining machine in the present embodiment may be operated by either the operator or the management system, the present embodiment is effective for a manned mining machine to compare driving skills among a plurality of operators or perform attendance management of the operator, for example. While the management system performs the process of specifying the route traveled by the mining machine in the present embodiment, the route specification process may instead be performed by the in-vehicle processor mounted in the mining machine.

REFERENCE SIGNS LIST 1 mining machine management system (management system)
4 loading machine
10 management device
12 management-side processing device
12a route determination unit
12b slope analysis unit
12c region specification unit
12d route information generation unit
12e route analysis unit
13 management-side storage device
14CS registered route database
14I operation information database
14RD LP/DP database
14SC route-specific specific section database
14WP route-specific WP database
18 management-side wireless communication device
20 dump truck
21 vehicle body
24 suspension cylinder
26 pressure sensor
29 position information detection device
CS registered route
CSr actual travel route
LK link
PI position information
SC specific section
WP passing position

The invention claimed is:

1. A mining machine management system comprising:
a position information detection unit which is mounted in a mining machine loading a load in a mine and transporting the load, and detects position information related to a position of the mining machine;
a storage unit which stores route information of a first route as a registered route, the first route being a route taken by the mining machine departing a predetermined first position, passing a second position as a loading position at which the load is loaded by a loading machine, and moving to a third position as a discharging position at which the load is removed; and
a region specification unit which uses a position information group obtained from a plurality of pieces of the position information detected by the position information detection unit while the mining machine is in operation to determine whether or not the loading position or the discharging position included in the position information group, on condition that the loading position or the discharging position included in the position information group is located within a predetermined range with respect to the loading position or the discharging position included in the route information of the first route, corresponds with the loading position or the discharging position included in the route information of the first route and, when the loading position or the discharging position included in the position information group is determined to correspond with the loading or discharging position included in the route information of the first route, corrects the loading position or the discharging position stored in the storage unit based on the position information of the loading position or the discharging position included in the position information group determined to correspond with the loading or discharging position included in the route information of the first route, wherein the loading position and the discharging position shift with an actual operation of the mining machine.

2. The mining machine management system according to claim 1, wherein when the region specification unit corrects the discharging position, the region specification unit corrects the discharging position on the registered route based on the position information of a position at which the load is removed from the mining machine within a first predetermined range around the discharging position on the registered route, from among the position information group.

3. The mining machine management system according to claim 2, wherein the correction is made by determining a middle point between the position at which the load is removed and the discharging position on the registered route to be a corrected discharging position on the registered route.

4. The mining machine management system according to claim 1, wherein the loading position is corrected by the region specification unit by determining position information of a position, at which the load is loaded onto the mining machine within a second predetermined range around the loading position on the registered route from among the position information group, to be a corrected loading position on the registered route.

5. A mining machine management system comprising:
a position information detection unit which is mounted in a mining machine loading a load in a mine and transporting the load, and detects position information related to a position of the mining machine;
a storage unit which stores route information of a first route as a registered route, the first route being a route taken by the mining machine departing a predetermined first position, passing a second position as a loading position at which the load is loaded, and moving to a third position as a discharging position at which the load is removed; and
a region specification unit which uses a position information group obtained from a plurality of pieces of the position information detected by the position information detection unit while the mining machine is in operation to determine whether or not the loading position or the discharging position included in the position information group, on condition that the loading position or the discharging position included in the position information group is located within a predetermined range with respect to the loading position or the discharging position included in the route information of the first route, corresponds with the loading position or the discharging position included in the route information of the first route and, when the loading position or the discharging position included in the position information group is determined to correspond with the loading or discharging position included in the route information of the first route, corrects the loading position or the discharging position stored in the storage unit based on the position information of the loading position or the discharging position included in the position information group determined to correspond with the loading or discharging position included in the route information of the first route, wherein
the mining machine management system further comprises a route information generation unit which generates route information of a route traveled by the mining machine, the route information including a plurality of nodes present at every predetermined distance of the route and a link connecting the nodes adjacent to each other, wherein
the route information generation unit generates the node in a region excluding an interior of a passing position exclusion region of a predetermined size that is set around the discharging position on the registered route.

6. The mining machine management system according to claim 5, wherein when correcting the discharging position, the region specification unit corrects the discharging position on the registered route based on position information of a position at which the load is removed from the mining machine within a first predetermined range that is smaller than the passing position exclusion region around the discharging position on the registered route, from among the position information group.

7. The mining machine management system according to claim 5, wherein the correction is made by determining a middle point between the position at which the load is removed and the discharging position on the registered route to be a corrected discharging position on the registered route.

8. A mining machine management system comprising:
a position information detection unit which is mounted in a mining machine loading a load in a mine and transporting the load, and detects position information related to a position of the mining machine;
a storage unit which stores route information of a first route as a registered route, the first route being a route taken by the mining machine departing a predetermined first position, passing a second position as a loading position at which the load is loaded, and moving to a third position as a discharging position at which the load is removed; and
a region specification unit which uses a position information group obtained from a plurality of pieces of the position information detected by the position information detection unit while the mining machine is in operation to determine whether or not the loading position or the discharging position included in the position information group, on condition that the loading position or the discharging position included in the position information group is located within a predetermined range with respect to the loading position or the discharging position included in the route information of the first route, corresponds with the loading position or the discharging position included in the route information of the first route and, when the loading position or the discharging position included in the position information group is determined to correspond with the loading or discharging position included in the route information of the first route, corrects the loading position or the discharging position stored in the storage unit based on the position information of the loading position or the discharging position included in the position information group determined to correspond with the loading or discharging position included in the route information of the first route, wherein the mining machine management system further comprises a route information generation unit which generates route information of a route traveled by the mining machine, the route information including a plurality of nodes present at every predetermined distance of the route and a link connecting the nodes adjacent to each other, wherein the route information generation unit generates the node in a region excluding an interior of a passing position exclusion region of a predetermined size that is set around the loading position on the register route.

9. The mining machine management system according to claim 8, wherein the route information generation unit determines that the loading station stays the same for a predetermined period of time when the loading position is within a predetermined range for the predetermined period of time.

10. The mining machine management system according to claim 8, wherein the correcting of the loading position by the region specification unit is performed by determining position information of a position, at which the load is loaded onto the mining machine within a second predetermined range that is smaller than the passing position exclusion region around the loading position on the registered route from among the position information group, to be a corrected loading position on the registered route.

11. A mining machine management system management method of managing a mining machine management system by a management device, the mining machine management system management method comprising:

detecting, by the management device, position information related to a position of a mining machine loading a load in a mine and transporting the load;

storing, by the management device, route information of a first route as a registered route, the first route being a route taken by the mining machine departing a predetermined first position, passing a second position as a loading position at which the load is loaded, and moving to a third position as a discharging position at which the load is removed;

determining, by the management device, using a position information group obtained from a plurality of pieces of the position information detected while the mining machine is in operation whether or not the loading position or the discharging position included in the position information group, on condition that the loading position or the discharging position included in the position information group is located within a predetermined range with respect to the loading position or the discharging position included in the route information of the first route, corresponds with the loading position or the discharging position included in the route information of the first route, wherein the loading position and the discharging position shift with an actual operation of the mining machine; and correcting, by the management device, the stored loading position or the stored discharging position based on position information of the loading position or the discharging position included in the position information group that is determined to correspond with the loading or discharging position included in the route information of the first route, when the loading position or the discharging position included in the position information group is determined to correspond with the loading or discharging position included in the route information of the first route.

12. The mining machine management system management method according to claim 11, wherein when correcting the discharging position, the discharging position on the registered route is corrected, by the management device, based on position information of a position at which the load is removed from the mining machine within a first predetermined range around the discharging position on the registered route, from among the position information group.

13. The mining machine management system management method according to claim 12, wherein the correction is, by the management device, made by determining a middle point between the position at which the load is removed and the discharging position on the registered route to be a corrected discharging position on the registered route.

14. The mining machine management system management method according to claim 12 or 13, wherein, after the correction is made, a node is, by the management device, generated in a region excluding an interior of a passing position exclusion region of a predetermined size that is set around the discharging position on the registered route and greater than the first predetermined range on a discharging side set around the discharging position on the registered route, the node being present at every predetermined distance of a route traveled by the mining machine.

15. The mining machine management system management method according to claim 11, wherein the loading position is, by the management device, corrected by determining position information of a position, at which the load is loaded onto the mining machine within a second predetermined range around the loading position on the registered route from among the position information group, to be a corrected loading position on the registered route.

16. The mining machine management system management method according to claim 15, wherein, after the correction is made, a node is, by the management device, generated in a region excluding an interior of a passing position exclusion region of a predetermined size that is greater than the second predetermined range on a loading side around the loading position on the registered route and is set around the loading position on the registered route, the node being present at every predetermined distance of a route traveled by the mining machine.

17. The mining machine management system management method according to claim 15, wherein, in detecting the loading position on the registered route, the loading station is, by the management device, determined to be the same for a predetermined period of time when the loading position is within a predetermined range for the predetermined period of time.

* * * * *